US012720558B2

(12) United States Patent
Elshafie et al.

(10) Patent No.: US 12,720,558 B2
(45) Date of Patent: Aug. 25, 2026

(54) ENHANCEMENTS TO PHYSICAL DOWNLINK CONTROL CHANNEL MONITORING AND SKIPPING

(71) Applicant: QUALCOMM Incorporated, San Diego, CA (US)

(72) Inventors: Ahmed Elshafie, San Diego, CA (US); Linhai He, San Diego, CA (US); Huilin Xu, Temecula, CA (US); Diana Maamari, San Diego, CA (US)

(73) Assignee: QUALCOMM Incorportated, San Diego, CA (US)

( * ) Notice: Subject to any disclaimer, the term of this patent is extended or adjusted under 35 U.S.C. 154(b) by 581 days.

(21) Appl. No.: 18/178,163

(22) Filed: Mar. 3, 2023

(65) Prior Publication Data

US 2024/0298324 A1 Sep. 5, 2024

(51) Int. Cl.

*H04W 72/23* (2023.01)

*H04W 72/542* (2023.01)

(52) U.S. Cl.

CPC ......... *H04W 72/23* (2023.01); *H04W 72/542* (2023.01)

(58) Field of Classification Search

CPC ............... H04W 72/23; H04W 72/542; H04W 52/0216; H04L 5/0094; H04L 5/0053

USPC .......................................................... 370/329

See application file for complete search history.

(56) References Cited

U.S. PATENT DOCUMENTS

| | | | | |
|---|---|---|---|---|
| 2022/0303960 | A1* | 9/2022 | Zhou | H04L 5/001 |
| 2022/0369231 | A1* | 11/2022 | Ma | H04W 52/028 |
| 2023/0141378 | A1* | 5/2023 | Lai | H04L 5/0053 370/329 |
| 2023/0379925 | A1* | 11/2023 | Pelletier | H04W 72/569 |
| 2024/0064754 | A1* | 2/2024 | Ohara | H04L 5/0053 |
| 2024/0064759 | A1* | 2/2024 | Lin | H04L 5/0051 |
| 2025/0151069 | A1* | 5/2025 | Bagheri | H04L 5/0094 |

OTHER PUBLICATIONS

Y.-N. R. Li, M. Chen, J. Xu, L. Tian and K. Huang, "Power Saving Techniques for 5G and Beyond," in IEEE Access, vol. 8, pp. 108675-108690, 2020 (Year: 2020).*

* cited by examiner

*Primary Examiner* — Christopher M Crutchfield
*Assistant Examiner* — Syed Ahmed
(74) *Attorney, Agent, or Firm* — Holland & Hart LLP

(57) ABSTRACT

Methods, systems, and devices for wireless communications are described. The techniques described herein relate to enhancements to physical downlink control channel (PDCCH) monitoring and skipping. A user equipment (UE) receives, from a network entity, a control message including a control channel skipping indication or a switching indication. The control channel skipping indication or the switching indication is associated with an application delay time duration that indicates a beginning of a control channel skipping or search space set group (SSSG) switching time duration. The UE adjusts an ending time of the application delay time duration based on feedback of whether a message was successfully received via a data channel. The UE skips monitoring of control channel occasions or transitioning from a first SSSG, beginning at the adjusted ending time of the application delay time duration.

30 Claims, 25 Drawing Sheets

| Codepoint (SR, SSSG) | Meaning |
|---|---|
| 00 | Negative SR + SSSG0 (e.g., Monitoring SS sets associated with SSSG0 |
| 01 | Negative SR + SSSG2 |
| 10 | Positive SR + SSSG0 |
| 11 | Positive SR + SSSG2 |

| Codepoint (SR, SSSG) | Meaning |
|---|---|
| 00 | Negative SR + SSSG0 |
| 01 | Negative SR + SSSG1 |
| 10 | Positive SR + SSSG0 |
| 11 | Positive SR + SSSG1 |

| **Codepoint (SR, SSSG)** | **Meaning** |
|---|---|
| Nothing | Negative SR |
| 00 | Positive SR + SSSG0 |
| 01 | Positive SR + SSSG1 (use same SSSG) |
| 10 | Positive SR + SSSG2 |
| 11 | Positive SR + SSSG3 |

| **Codepoint (SR, SSSG)** | **Meaning** |
|---|---|
| 00 | Negative SR + SSSG1 |
| 01 | Negative SR + SSSG2 |
| 10 | Positive SR + SSSG1 |
| 11 | Positive SR + SSSG2 |

| Codepoint (SR, SSSG) | Meaning |
|---|---|
| 00 | Negative SR + stay on same SSSG |
| 01 | Negative SR + SSSG2 |
| 10 | Positive SR + SSSG0 |
| 11 | Positive SR + SSSG2 |

| Codepoint (SR, SSSG) | Meaning |
|---|---|
| 00 | Negative SR + SSSG0 |
| 01 | Negative SR + SSSG1 |
| 10 | Positive SR + SSSG0 |
| 11 | Positive SR + SSSG1 |

| Codepoint (SR, SSSG) | Meaning |
|---|---|
| 000 | Negative SR + SSSG0 |
| 001 | Negative SR + SSSG1 |
| 010 | Positive SR + SSSG0 |
| 011 | Positive SR + SSSG1 |
| 100 | Negative SR + SSSG2 |
| 101 | Negative SR + SSSG3 |
| 110 | Positive SR + SSSG2 |
| 111 | Positive SR + SSSG3 |

| Codepoint (SR, SSSG) | Meaning |
|---|---|
| 000 | Negative SR + SSSG0 |
| 001 | Negative SR + SSSG1 |
| 010 | Positive SR + SSSG0 |
| 011 | Positive SR + SSSG1 |
| 100 | Negative SR + SSSG2 |
| 101 | Negative SR + Stopping PDCCH monitoring for a duration X |
| 110 | Positive SR + SSSG2 |
| 111 | Positive SR + Stopping PDCCH monitoring for a duration X |

Figure 11:
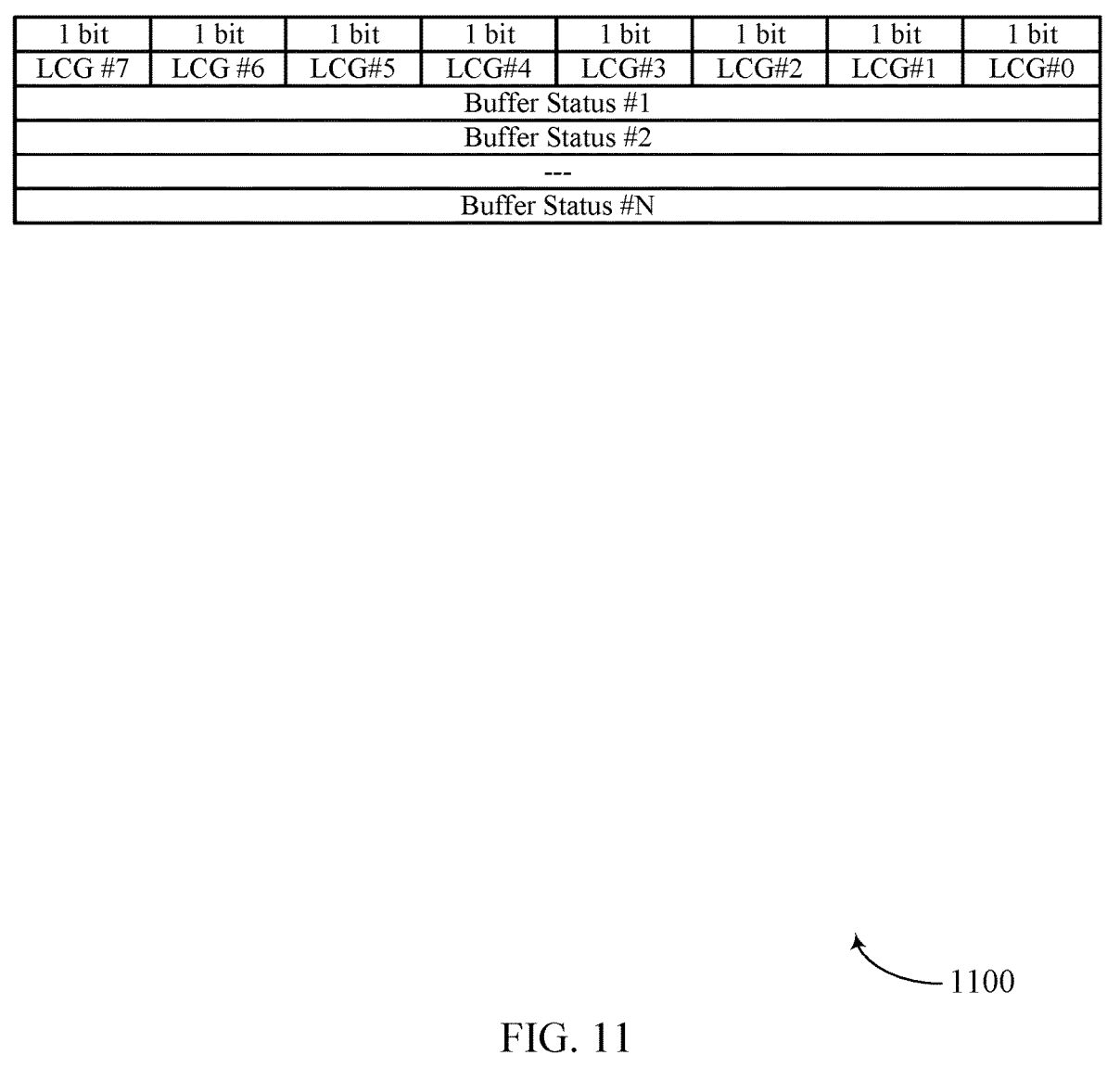

| 1 bit | 1 bit | 1 bit | 1 bit | 1 bit | 1 bit | 1 bit | 1 bit |
|---|---|---|---|---|---|---|---|
| LCG #7 | LCG #6 | LCG#5 | LCG#4 | LCG#3 | LCG#2 | LCG#1 | LCG#0 |
| Buffer Status #1 | | | | | | | |
| Buffer Status #2 | | | | | | | |
| --- | | | | | | | |
| Buffer Status #N | | | | | | | |

| Codepoint (HARQ-ACK, SSSG) | Meaning |
|---|---|
| 00 | NACK + SSSG0 |
| 01 | NACK + SSSG1 |
| 10 | ACK + SSSG0 |
| 11 | ACK + SSSG1 |

| Codepoint (HARQ-ACK, SSSG) | Meaning |
|---|---|
| Nothing | NACK |
| 00 | ACK + SSSG0 |
| 01 | ACK + SSSG1 |
| 10 | ACK + SSSG0 |
| 11 | ACK + SSSG1 |

| Codepoint (HARQ-ACK, SSSG) | Meaning |
| --- | --- |
| 000 | NACK + SSSG0 |
| 001 | NACK + SSSG1 |
| 010 | ACK + SSSG0 |
| 011 | ACK + SSSG1 |
| 100 | NACK + SSSG2 |
| 101 | NACK + SSSG3 |
| 110 | ACK + SSSG2 |
| 111 | ACK + SSSG3 |

| Codepoint (HARQ-ACK, SSSG) | Meaning |
|---|---|
| 000 | NACK + SSSG0 (e.g., monitoring SS sets associated with SSSG#0) |
| 001 | NACK + SSSG1 |
| 010 | ACK + PDCCH |
| 011 | ACK + SSSG1 |
| 100 | NACK + SSSG2 |
| 101 | NACK + stopping PDCCH monitoring for a duration X |
| 110 | ACK + SSSG2 |
| 111 | ACK + stopping PDCCH monitoring for a duration X |

Transmit, to a UE, a control message scheduling transmission of a message in a data channel and including a control channel skipping indication or a switching indication, the control channel skipping indication or the switching indication being associated with an application delay time duration that indicates a beginning of a control channel skipping time duration or a beginning time for a search space set group switch

2505

Transmit, to the UE, an indication of an adjustment to an ending time of the application delay time duration

2510

2500

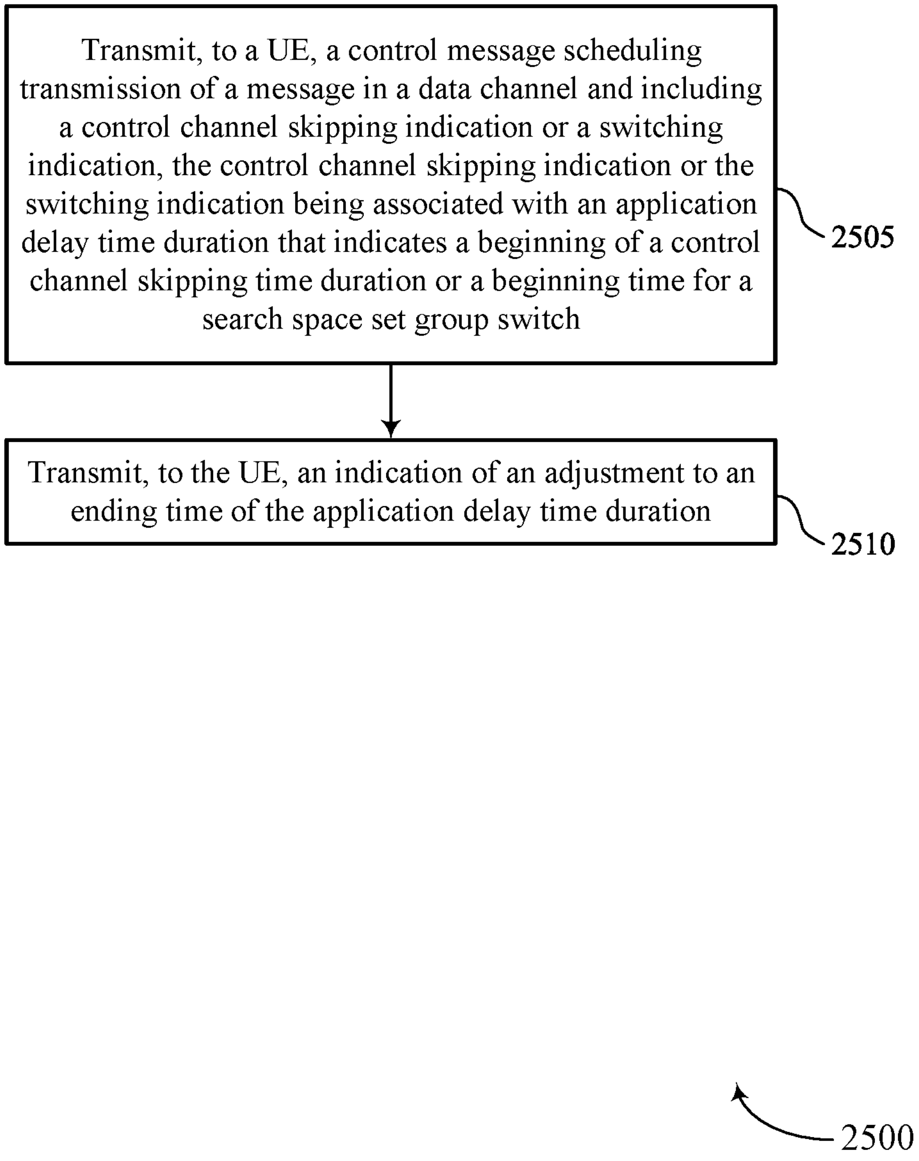

FIG. 25

ENHANCEMENTS TO PHYSICAL DOWNLINK CONTROL CHANNEL MONITORING AND SKIPPING

FIELD OF TECHNOLOGY

The present disclosure relates to wireless communications, including enhancements to physical downlink control channel monitoring and skipping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support enhancements to physical downlink control channel (PDCCH) monitoring and skipping. A user equipment (UE) that receives a downlink control information (DCI) that indicates to skip PDCCH monitoring occasion(s) or to switch search space set groups (SSSGs) may adjust the ending time of the application delay (e.g., the UE may adjust the time between reception of the DCI and the time when the UE begins to skip PDCCH monitoring occasions or the time when the UE switches SSSGs). For example, based on transmitting a negative acknowledgement (NACK) (e.g., for a data channel message scheduled by the DCI), the UE may increase the application delay in order to receive the PDCCH carrying a DCI scheduling the retransmission. As another example, if the remaining packet delay budget of the data channel transmission is below a threshold such that hybrid automatic repeat request (HARQ) feedback is canceled, the application delay may be decreased as the UE will not monitor a PDCCH for a DCI scheduling retransmission of the packet. In some examples, the network may transmit layer 1, layer 2, or layer 3 signaling indicating an update to the application delay. In some examples, the UE may transmit signaling requesting an update for the application delay (e.g., via layer 1, layer 2, or layer 3 signaling), and in response, the network may transmit layer 1, layer 2, or layer 3 signaling indicating the update to the application delay. In some examples, the UE may update the application delay based on a power condition at the UE (e.g., in order to save power at the UE, the UE may begin to skip PDDCH monitoring occasions earlier). In some examples, the UE may transmit a request (e.g., via new signaling or multiplexed onto existing signals such as scheduling requests, power headroom reports (PHRs), buffer status reports, channel state information (CSI) reports, HARQ feedback messages, or random access channel (RACH) messages) to begin skipping monitoring of PDCCH monitoring occasions or to switch SSSGs, and DCI that indicates to skip PDCCH monitoring occasion(s) or to switch SSSGs is responsive to the request from the UE.

A method for wireless communication at a UE is described. The method may include receiving, from a network entity, a control message including a control channel skipping indication or a switching indication, the control channel skipping indication or the switching indication being associated with an application delay time duration that indicates a beginning of a control channel skipping time duration or a beginning time for a SSSG switch, adjusting an ending time of the application delay time duration based on feedback indicating whether a message was successfully received via a data channel, and skipping monitoring of one or more control channel occasions, or transitioning from a first SSSG to a second SSSG, beginning at the adjusted ending time of the application delay time duration.

An apparatus for wireless communication at a UE is described. The apparatus may include a processor, memory coupled with the processor, and instructions stored in the memory. The instructions may be executable by the processor to cause the apparatus to receive, from a network entity, a control message including a control channel skipping indication or a switching indication, the control channel skipping indication or the switching indication being associated with an application delay time duration that indicates a beginning of a control channel skipping time duration or a beginning time for a SSSG switch, adjust an ending time of the application delay time duration based on feedback indicating whether a message was successfully received via a data channel, and skip monitoring of one or more control channel occasions, or transitioning from a first SSSG to a second SSSG, beginning at the adjusted ending time of the application delay time duration.

Another apparatus for wireless communication at a UE is described. The apparatus may include means for receiving, from a network entity, a control message including a control channel skipping indication or a switching indication, the control channel skipping indication or the switching indication being associated with an application delay time duration that indicates a beginning of a control channel skipping time duration or a beginning time for a SSSG switch, means for adjusting an ending time of the application delay time duration based on feedback indicating whether a message was successfully received via a data channel, and means for skipping monitoring of one or more control channel occasions, or transitioning from a first SSSG to a second SSSG, beginning at the adjusted ending time of the application delay time duration.

A non-transitory computer-readable medium storing code for wireless communication at a UE is described. The code may include instructions executable by a processor to receive, from a network entity, a control message including a control channel skipping indication or a switching indication, the control channel skipping indication or the switching indication being associated with an application delay time duration that indicates a beginning of a control channel skipping time duration or a beginning time for a SSSG switch, adjust an ending time of the application delay time duration based on feedback indicating whether a message was successfully received via a data channel, and skip monitoring of one or more control channel occasions, or transitioning from a first SSSG to a second SSSG, beginning at the adjusted ending time of the application delay time duration.

Some examples of the method, apparatuses, and non-transitory computer-readable medium described herein may further include operations, features, means, or instructions for receiving, from the network entity, an indication of an update to the application delay time duration, where adjusting the ending time of the application delay time duration may be based on the update.

Some examples of the method, apparatuses, and non-transitory computer-readable medium described herein may further include operations, features, means, or instructions for transmitting, to the network entity, a request to update the application delay time duration, where the indication of the update to the application delay time duration may be responsive to the request.

In some examples of the method, apparatuses, and non-transitory computer-readable medium described herein, receiving the indication of the update to the application delay time duration may include operations, features, means, or instructions for receiving the indication of the update to the application delay time duration via the control message.

In some examples of the method, apparatuses, and non-transitory computer-readable medium described herein, adjusting the ending time of the application delay time duration may include operations, features, means, or instructions for adjusting the ending time of the application delay time duration based on at least one of a power condition at the UE, a traffic information at the UE, a decoding status of data packets at the UE, or any combination thereof.

Some examples of the method, apparatuses, and non-transitory computer-readable medium described herein may further include operations, features, means, or instructions for transmitting, to the network entity, a report indicating the power condition at the UE, where adjusting the ending time of the application delay time duration may be based on transmission of the report indicating at least a portion of the power condition at the UE, the traffic information at the UE, the decoding status of the data packets at the UE, or any combination thereof.

Some examples of the method, apparatuses, and non-transitory computer-readable medium described herein may further include operations, features, means, or instructions for transmitting, to the network entity, a feedback message indicating unsuccessful decoding of the message, where adjusting the ending time of the application delay time duration may be based on transmission of the feedback message.

Some examples of the method, apparatuses, and non-transitory computer-readable medium described herein may further include operations, features, means, or instructions for receiving, from the network entity, an indication of a packet delay budget or a priority associated with the message, where adjusting the ending time of the application delay time duration may be based on the packet delay budget or the priority associated with the message.

Some examples of the method, apparatuses, and non-transitory computer-readable medium described herein may further include operations, features, means, or instructions for cancelling transmission of a feedback message for the message based on a remainder of the packet delay budget being less than a threshold, where adjusting the ending time of the application delay time duration may be based on cancelling transmission of the feedback message.

In some examples of the method, apparatuses, and non-transitory computer-readable medium described herein, adjusting the ending time of the application delay time duration may include operations, features, means, or instructions for adjusting the ending time of the application delay time duration based on an ending time of an active period of a discontinuous reception cycle at the UE.

Some examples of the method, apparatuses, and non-transitory computer-readable medium described herein may further include operations, features, means, or instructions for transmitting, to the network entity, a request to perform control channel skipping during a time interval or to switch an active SSSG, where the control channel skipping indication or the switching indication may be responsive to the request, and where the request may be transmitted based on a trigger event.

In some examples of the method, apparatuses, and non-transitory computer-readable medium described herein, the trigger event includes at least one of power condition, an energy harvesting condition, a traffic condition, or any combination thereof.

In some examples of the method, apparatuses, and non-transitory computer-readable medium described herein, transmitting the request may include operations, features, means, or instructions for transmitting the request via one or more of at least one of a dedicated resource for data transmission, a dedicated resource for control transmission, a scheduling request, a buffer status report, a CSI report, a HARQ feedback message, a random access channel message, a transmission end of burst indication from the UE, a user assistance information, a PHR, or any combination thereof.

Some examples of the method, apparatuses, and non-transitory computer-readable medium described herein may further include operations, features, means, or instructions for receiving an indication of a configuration for requesting to perform control channel skipping or to switch the active SSSG, where transmission of the request may be in accordance with the configuration.

Some examples of the method, apparatuses, and non-transitory computer-readable medium described herein may further include operations, features, means, or instructions for transmitting, to the network entity, an acknowledgment message confirming the control channel skipping indication or the switching indication, where the skipping monitoring of one or more control channel occasions or transitioning from the first SSSG to the second SSSG may be based on the acknowledgment message.

Some examples of the method, apparatuses, and non-transitory computer-readable medium described herein may further include operations, features, means, or instructions for transmitting, to the network entity, a request to update the control channel skipping indication or the switching indication, the request indicating the beginning of the control channel skipping time duration, the beginning time for the SSSG switch, or the second SSSG.

A method for wireless communications is described. The method may include transmitting, to a UE, a control message scheduling transmission of a message in a data channel and including a control channel skipping indication or a switching indication, the control channel skipping indication or the switching indication being associated with an application delay time duration that indicates a beginning of a control channel skipping time duration or a beginning time for a SSSG switch and transmitting, to the UE, an indication of an adjustment to an ending time of the application delay time duration.

An apparatus for wireless communications is described. The apparatus may include a processor, memory coupled with the processor, and instructions stored in the memory. The instructions may be executable by the processor to cause the apparatus to transmit, to a UE, a control message scheduling transmission of a message in a data channel and including a control channel skipping indication or a switching indication, the control channel skipping indication or the switching indication being associated with an application delay time duration that indicates a beginning of a control channel skipping time duration or a beginning time for a SSSG switch and transmit, to the UE, an indication of an adjustment to an ending time of the application delay time duration.

Another apparatus for wireless communications is described. The apparatus may include means for transmitting, to a UE, a control message scheduling transmission of a message in a data channel and including a control channel skipping indication or a switching indication, the control channel skipping indication or the switching indication being associated with an application delay time duration that indicates a beginning of a control channel skipping time duration or a beginning time for a SSSG switch and means for transmitting, to the UE, an indication of an adjustment to an ending time of the application delay time duration.

A non-transitory computer-readable medium storing code for wireless communications is described. The code may include instructions executable by a processor to transmit, to a UE, a control message scheduling transmission of a message in a data channel and including a control channel skipping indication or a switching indication, the control channel skipping indication or the switching indication being associated with an application delay time duration that indicates a beginning of a control channel skipping time duration or a beginning time for a SSSG switch and transmit, to the UE, an indication of an adjustment to an ending time of the application delay time duration.

Some examples of the method, apparatuses, and non-transitory computer-readable medium described herein may further include operations, features, means, or instructions for receiving, from the UE, a request to update the application delay time duration, where the indication of the adjustment to the ending time of the application delay time duration may be responsive to the request.

In some examples of the method, apparatuses, and non-transitory computer-readable medium described herein, transmitting the indication of the adjustment to the ending time of the application delay time duration may include operations, features, means, or instructions for transmitting the indication of the adjustment to the ending time of the application delay time duration via the control message.

Some examples of the method, apparatuses, and non-transitory computer-readable medium described herein may further include operations, features, means, or instructions for receiving, from the UE, a report indicating a power condition at the UE, where the adjustment to the ending time of the application delay time duration may be based on transmission of the report indicating the power condition at the UE.

Some examples of the method, apparatuses, and non-transitory computer-readable medium described herein may further include operations, features, means, or instructions for receiving, from the UE, a feedback message indicating unsuccessful decoding of the message, where the adjustment to the ending time of the application delay time duration may be based on reception of the feedback message.

Some examples of the method, apparatuses, and non-transitory computer-readable medium described herein may further include operations, features, means, or instructions for transmitting, to the UE, an indication of a packet delay budget or a priority associated with a message scheduled by the control message, where the adjustment to the ending time of the application delay time duration may be based on the packet delay budget or the priority associated with the message.

In some examples of the method, apparatuses, and non-transitory computer-readable medium described herein, the adjustment to the ending time of the application delay time duration may be based on an ending time of an active period of a discontinuous reception cycle at the UE.

Some examples of the method, apparatuses, and non-transitory computer-readable medium described herein may further include operations, features, means, or instructions for receiving, from the UE, a request to perform control channel skipping during a time interval or to switch an active SSSG, where the control channel skipping indication or the switching indication may be responsive to the request.

In some examples of the method, apparatuses, and non-transitory computer-readable medium described herein, receiving the request may include operations, features, means, or instructions for receiving the request via one or more of at least one of a dedicated resource for data transmission, a dedicated resource for control transmission, a scheduling request, a buffer status report, a CSI report, a HARQ feedback message, a random access channel message, a transmission end of burst indication from the UE, a user assistance information, a PHR, or any combination thereof.

Some examples of the method, apparatuses, and non-transitory computer-readable medium described herein may further include operations, features, means, or instructions for transmitting, to the UE, an indication of a configuration for requesting to perform control channel skipping or to switch the active SSSG, where reception of the request may be in accordance with the configuration.

Some examples of the method, apparatuses, and non-transitory computer-readable medium described herein may further include operations, features, means, or instructions for receiving, from the UE, an acknowledgment message confirming the control channel skipping indication or the switching indication.

Some examples of the method, apparatuses, and non-transitory computer-readable medium described herein may further include operations, features, means, or instructions for receiving, from the UE, a request to update the control channel skipping indication or the switching indication, the request indicating the beginning of the control channel skipping time duration, the beginning time for the SSSG switch, or a second SSSG.

BRIEF DESCRIPTION OF THE DRAWINGS

FIG. 4 illustrates an example of a codebook for multiplexing scheduling requests that supports enhancements to PDCCH monitoring and skipping in accordance with one or more aspects of the present disclosure.

FIG. 5 illustrates another example of a codebook for multiplexing scheduling requests that supports enhancements to PDCCH monitoring and skipping in accordance with one or more aspects of the present disclosure.

FIG. 6 illustrates another example of a codebook for multiplexing scheduling requests that supports enhancements to PDCCH monitoring and skipping in accordance with one or more aspects of the present disclosure.

FIG. 7 illustrates another example of a codebook for multiplexing scheduling requests that supports enhancements to PDCCH monitoring and skipping in accordance with one or more aspects of the present disclosure.

FIG. 8 illustrates another example of a codebook for multiplexing scheduling requests that supports enhancements to PDCCH monitoring and skipping in accordance with one or more aspects of the present disclosure.

FIG. 9 illustrates another example of a codebook for multiplexing scheduling requests that supports enhancements to PDCCH monitoring and skipping in accordance with one or more aspects of the present disclosure.

FIG. 10 illustrates another example of a codebook for multiplexing scheduling requests that supports enhancements to PDCCH monitoring and skipping in accordance with one or more aspects of the present disclosure.

FIG. 11 illustrates another example of a codebook for multiplexing scheduling requests that supports enhancements to PDCCH monitoring and skipping in accordance with one or more aspects of the present disclosure.

FIG. 12 illustrates another example of a codebook for multiplexing scheduling requests that supports enhancements to PDCCH monitoring and skipping in accordance with one or more aspects of the present disclosure.

FIG. 13 illustrates another example of a codebook for multiplexing scheduling requests that supports enhancements to PDCCH monitoring and skipping in accordance with one or more aspects of the present disclosure.

FIG. 14 illustrates another example of a codebook for multiplexing scheduling requests that supports enhancements to PDCCH monitoring and skipping in accordance with one or more aspects of the present disclosure.

FIGS. 24 and 25 illustrate flowcharts showing methods that support enhancements to PDCCH monitoring and skipping in accordance with one or more aspects of the present disclosure.

DETAILED DESCRIPTION

Figure 1:
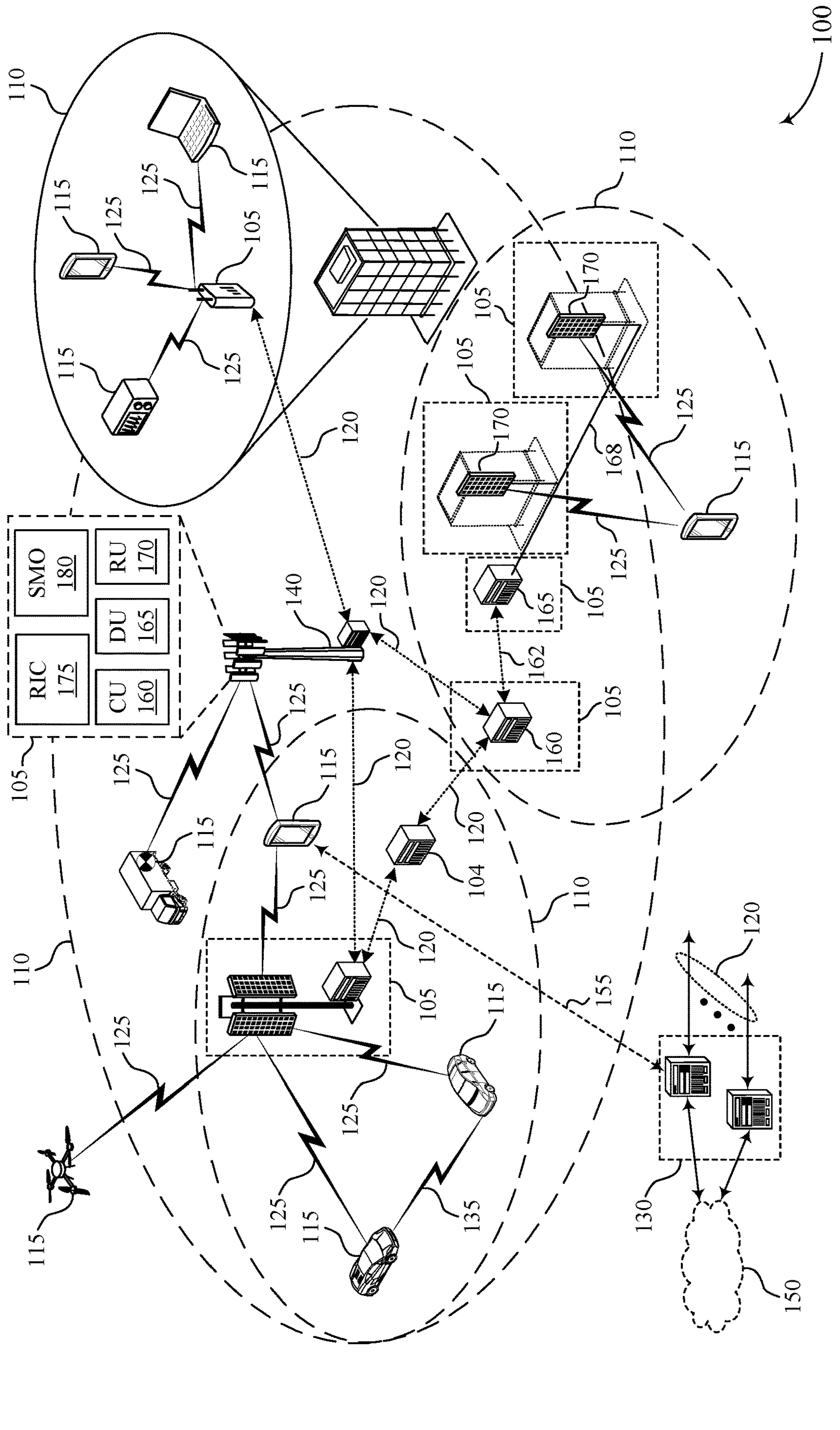
FIG. 1 illustrates an example of a wireless communications system that supports enhancements to physical downlink control channel (PDCCH) monitoring and skipping in accordance with one or more aspects of the present disclosure.

In wireless communications systems, a user equipment (UE) monitors for a physical downlink control channel (PDCCH) in a configured search space set group (SSSG). In some cases, a downlink control information (DCI) may indicate to skip one or more PDCCH monitoring occasions, for example, to save power at the UE. A DCI may also or alternatively indicate to switch the active SSSG. The UE may start skipping the PDCCH monitoring occasions and/or switch the active SSSG after an application delay after reception of the DCI. The application delay for an SSSG switch may be different from the application delay for skipping PDCCH monitoring occasions. In some examples, the application delay may be zero. In some cases, an application delay may refer to a switch time of an SSSG switch. The DCI may also schedule a data channel transmission (e.g., a physical downlink shared channel (PDSCH)). The application delay may be based on a time to receive the data channel transmission scheduled by the DCI and prepare and transmit hybrid automatic repeat request (HARQ) feedback for the data channel transmission. If the UE begins skipping PDCCH monitoring occasions or switches SSSGs after transmitting a negative acknowledgment (NACK), however, the UE may miss the PDCCH that carries a DCI scheduling a retransmission of the data channel transmission in response to the NACK. Additionally, in some cases, HARQ feedback may not be used, for example due to latency demands for a particular communication or due to power saving modes at the UE, and accordingly delaying skipping monitoring or switching of SSSGs based on the application delay may result in increased latency or power consumption at the UE.

A UE that receives a DCI that indicates to skip PDCCH monitoring occasion(s) or to switch SSSGs may adjust the ending time of the application delay (e.g., the UE may adjust the time between reception of the DCI and the time when the UE begins to skip PDCCH monitoring occasions or the time when the UE switches SSSGs). For example, based on transmitting a NACK for a data channel message (e.g., scheduled by the DCI), the UE may increase the application delay in order to receive the PDCCH carrying a DCI scheduling the retransmission. As another example, if the remaining packet delay budget of a data channel transmission scheduled by the DCI is below a threshold such that HARQ feedback is canceled, the application delay may be decreased as the UE may not monitor a PDCCH for a DCI scheduling retransmission of the packet. In some examples, the network may transmit layer 1 (L1), layer 2 (L2), or layer 3 (L3) signaling indicating an update to the application delay. In some examples, the UE may transmit signaling requesting an update for the application delay (e.g., via L1, L2, or L3 signaling), and in response the network may transmit L1, L2, or L3 signaling indicating the update to the application delay. In some examples, the UE may update the application delay based on a power condition at the UE (e.g., in order to save power at the UE, the UE may begin to skip PDDCH monitoring occasions earlier). In some examples, the UE may transmit a request (e.g., via new signaling or multiplexed onto existing signals such as scheduling requests, power headroom reports (PHRs), buffer status reports, channel state information reports, HARQ feedback messages, or RACH messages) to begin skipping monitoring of PDCCH monitoring occasions or to switch SSSGs, and DCI that indicates to skip PDCCH monitoring occasion(s) or to switch SSSGs is responsive to the request from the UE.

Aspects of the disclosure are initially described in the context of wireless communications systems. Aspects of the disclosure are further illustrated by and described with reference to apparatus diagrams, system diagrams, and flowcharts that relate to enhancements to PDCCH monitoring and skipping.

FIG. 1 illustrates an example of a wireless communications system 100 that supports enhancements to PDCCH monitoring and skipping in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. Devices in wireless communications system 100 may communicate over unlicensed spectrum, which may be a portion of spectrum that includes frequency bands traditionally used by Wi-Fi technology, such as the 5 gigahertz (GHz) band, the 2.4 GHz band, the 60 GHz band, the 3.6 GHz band, and/or the 900 MHz band. The unlicensed spectrum may also include other frequency bands.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, a New Radio (NR) technology base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support enhancements to PDCCH monitoring and skipping as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 GHz. Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. The HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 that receives a DCI that indicates to skip PDCCH monitoring occasion(s) or to switch SSSGs may adjust the ending time of the application delay (e.g., the UE 115 may adjust the time between reception of the DCI and the time when the UE 115 begins to skip PDCCH monitoring occasions or the time when the UE 115 switches SSSGs). For example, based on transmitting a NACK for a data channel transmission (e.g., scheduled by the DCI), the UE 115 may increase the application delay in order to receive the PDCCH carrying a DCI scheduling the retransmission. As another example, if the remaining packet delay budget of a data channel transmission scheduled by the DCI is below a threshold such that HARQ feedback is canceled, the application delay may be decreased as the UE 115 may not monitor a PDCCH for a DCI scheduling retransmission of the packet. In some examples, the network may transmit L1, L2, or L3 signaling indicating an update to the application delay. In some examples, the UE 115 may transmit signaling requesting an update for the application delay (e.g., via L1, L2, or L3 signaling), and in response the network may transmit L1, L2, or L3 signaling indicating the update to the application delay. In some examples, the UE 115 may update the application delay based on a power condition at the UE 115 (e.g., in order to save power at the UE 115, the UE 115 may begin to skip PDDCH monitoring occasions earlier). In some examples, the UE 115 may transmit a request (e.g., via new signaling or multiplexed onto existing signals such as scheduling requests, PHRs, buffer status reports, channel state information reports, HARQ feedback messages, or RACH messages) to begin skipping monitoring of PDCCH monitoring occasions or to switch SSSGs, and DCI that indicates to skip PDCCH monitoring occasion(s) or to switch SSSGs is responsive to the request from the UE 115.

Figure 2:
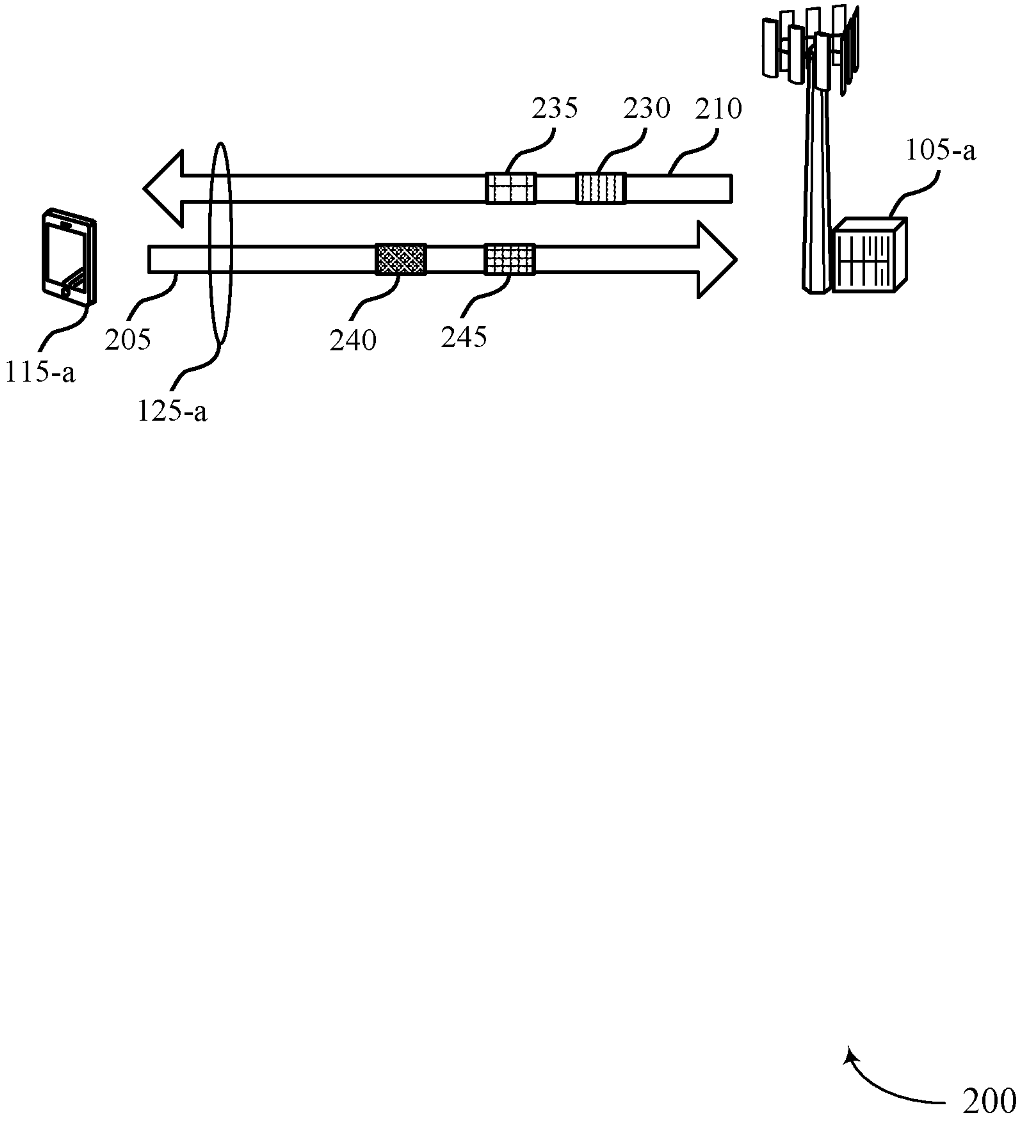
FIG. 2 illustrates another example of wireless communications system that supports enhancements to PDCCH monitoring and skipping in accordance with one or more aspects of the present disclosure.

FIG. 2 illustrates an example of a wireless communications system 200 that supports enhancements to PDCCH monitoring and skipping in accordance with one or more aspects of the present disclosure. The wireless communications system 200 may implement aspects of or may be implemented by aspects of the wireless communications system 100. For example, the wireless communications system 200 includes a UE 115-*a*, which may be an example of a UE 115 described with respect to FIG. 1. The wireless communications system 200 also includes a network entity 105-*a*, which may be an example of a network entity 105 as described with respect to FIG. 1.

The network entity 105-*a* may communicate with the UE 115-*a* using a communication link 125-*a*. The communication link 125-*a* may be an example of an NR or LTE link between the UE 115-*a* and the network entity 105-*a*. The communication link 125-*a* may include a bi-directional link that enables both uplink and downlink communications. For example, the UE 115-*a* may transmit uplink signals 205 (e.g., uplink transmissions), such as uplink control signals or uplink data signals, to the network entity 105-*a* using the communication link 125-*a* and the network entity 105-*a* may transmit downlink signals 210 (e.g., downlink transmissions), such as downlink control signals or downlink data signals, to the UE 115-*a* using the communication link 125-*a*.

The UE 115-*a* may receive a control message 230 or an indication (e.g., via DCI) from the network entity 105-*a* to behave in accordance with one or more configurations. For example, the control message 230 may indicate to the UE 115-*a* to perform PDCCH skipping and/or SSSG switching, as well as to schedule transmissions. The indication may correspond to a first PDCCH behavior (Beh 1) where PDCCH skipping is not activated or triggered for the UE 115-*a*. The indication may correspond to a second PDCCH behavior (Beh 1A) where the UE 115-*a* is configured to stop PDCCH monitoring for a duration X, where X is a predetermined time (e.g., 100 ms).

In some examples, the indication may correspond to a first SSSG switching behavior (Beh 2) where the UE 115-*a* is configured to stop monitoring search space (SS) sets associated with a second SSSG (SSSG #1) and a third SSSG (SSSG #2) and to monitor SS sets associated with a first SSSG (SSSG #0). The indication may correspond to a second SSSG switching behavior (Beh 2A) where the UE 115-*a* is configured to stop monitoring SS sets associated with the first SSSG (SSSG #0) and the third SSSG (SSSG #2) and to monitor SS sets associated with the second SSSG (SSSG #1). The indication may correspond to a third SSSG switching behavior (Beh 2B) where the UE 115-*a* is configured to stop monitoring SS sets associated with the first SSSG (SSSG #0) and the second SSSG (SSSG #1) and to monitor SS sets associated with the third SSSG (SSSG #2).

The PDCCH skipping and SSSG switching may be applied at least for a Type 3 common search space (CSS) set and a UE-specified search space (USS) set. Other CSSs may be monitored regardless of SSSG switching and PDCCH skipping (e.g., exceptions to indications). In some examples, by configuring the UE 115-*a* based on the Beh 1A, the UE 115-*a* may receive an indication with a value of X duration (e.g., duration to stop PDCCH monitoring) among M RRC-configured values, where M corresponds to a value or an integer greater than zero. In some examples, the maximum value of M is 3. In some examples, the value may be 0 or preconfigured to be 0 (e.g., in 3rd Generation Partnership Project (3GPP) Release 17 (Rel-17)). This initial value or configured value may be based on a UE capability (e.g., a UE class and capability and/or per UE class or capability). The L1/L2/L3 configurations, broadcast signaling, or RACH may be used to configure the initial M values for the UE 115. The initial M values may be negotiated during RACH between UE 115-*a* and the network entity 105-*a*, or the UE 115-*a* may indicate the values as part of RACH or capability inquiry. The L1/L2/L3 configurations or multiplexed with L1/L2/L3 indications may be sent from the network entity 105-*a*. The indications may be dynamic, such that the indication may be based on one or more predetermined parameters. The time may be defined in terms of symbols, a bundle of symbols, sub-slots, slots, seconds (e.g., ms), or some other time measuring unit.

The network entity 105-*a* may transmit an application delay indication 235 (e.g., via another control message) to the UE 115-*a*. The application delay indication 235 may indicate an update to the application delay time duration. The update may cause an adjustment to the ending time of the application delay time duration, which indicates a beginning of a control channel skipping time duration or a beginning time for a SSSG switch. Accordingly, the UE 115-*a* may transmit an update request 240 to the network entity 105-*a* to update the application delay. The UE 115-*a* may also transmit a report 245 indicating a power condition at the UE 115-*a* to the network entity 105-*a*. The report may cause (e.g., a trigger event) for the network entity 105-*a* to indicate an adjustment to the ending time of the application delay time duration. The report 245 may indicate a power condition at the UE 115-*a*, the traffic information at the UE 115-*a*, and/or the decoding status of the data packets at the UE 115-*a*.

In some examples, the reports, which may be sent or multiplexed with signals, may be triggered. In some examples, after or in response to a trigger an event of an energy harvesting period/duration/cycle or lack of energy interval (trigger of report) or based on some factors on energy profile (e.g., charging rate profile, discharging rate profile, energy level profile), the UE 115 may send an indication or request for SSSG/PDCCH skipping. The UE 115 may send an indication or request for SSSG/PDCCH skipping based on an explicit request from the network entity 105 or by configuration or traffic statistics conditions. The indication may be sent in associated resources with the event, indicated in L1/L2/L3 resources, or multiplexed with any L1/L2/L3 signals.

In some examples, before an event trigger of an energy harvesting period/duration/cycle or lack of energy interval (trigger of report) occurs or the event trigger is detected based on some factors on energy profile (e.g., charging rate profile, discharging rate profile, energy level profile), the UE 115 may send an indication or request for SSSG/PDCCH skipping. The UE 115 may send an indication or request for SSSG/PDCCH skipping based on an explicit request from the network entity 105 or by configuration or traffic statistics conditions (e.g., at least DL or UL traffic type and statistics and information (time between arrivals, arrival rate, delay profile or packet delay, etc.). The indication may be sent in associated resources with the event, indicated in L1/L2/L3 resources, or multiplexed with any L1/L2/L3 signals.

In regard to the PDCCH skipping, the skip duration may be up to 3 values that may be configured, and the skipping may be defined in terms of a subcarrier spacing (SCS) and X (in slots). In some examples, the values of X may correspond to time that is up to 100 ms. In some examples, a SCS of 15 kilohertz (kHz) may support values of X (in slots) of 1, 2, 3 . . . 20, 30, 40, 50, 60, 80, and 100. An SCS of 30 kHz may support values of X of 1, 2, 3 . . . 40, 60, 80, 100, 120, 160, and 200. An SCS of 60 kHz may support values of X of 1, 2, 3 . . . 80, 120, 160, 200, 240, 320, and 400. An SCS of 120 kHz may support values of X of 1, 2, 3 . . . 160, 240, 320, 400, 480, 640, and 800. The PDCCH skipping duration configuration may be per BWP. Some exceptions to the PDCCH skipping may include monitoring Type0/0A/1/2 CSS, monitoring of DCI format 2_6 (wake up signal (WUS)) in Type3 CSS outside a discontinuous reception (DRX) active time, monitoring of DCI formats 0_0/1_0 with a cell radio network temporary identifier (C-RNTI), a modulation and coding scheme (MCS)-C-RNTI, or a configured scheduling (CS)-RNTI in Type 0/0A/1/2 CSS during PDCCH skipping.

In regard to SSSG switching, an SSSG timer operation may be implemented in some examples. At the first slot after switching, for example, to SSSG #1 or SSSG #2, the UE 115-*a* may set a SSSG switching timer. The timer may be reset after a slot that the UE 115-*a* detects a DCI format with CRC scrambled by C-RNTI/CS-RNTI/MCS-C-RNTI (unicast PDCCH). Otherwise, the timer may be decreased by one after each slot. If the UE 115-*a* monitors PDCCH according to SSSG #1 or SSSG #2 (e.g., switched to SSSG) and the timer expires (timer value reaches zero), the UE 115-*a* may start monitoring PDCCH according to SSSG #0 (e.g., default SSSG) after an application delay. The timer values may be defined in terms of SCS and the timer (in slots). In some examples, an SCS of 15 kHz may support values of X of 1, 2, 3 . . . 20, 30, 40, 50, 60, 80, and 100. An SCS of 30 kHz may support values of X of 1, 2, 3 . . . 40, 60, 80, 100, 120, 160, and 200. An SCS of 60 kHz may support values of X of 1, 2, 3 . . . 80, 120, 160, 200, 240, 320, and 400. An SCS of 120 kHz may support values of X of 1, 2, 3 . . . 160, 240, 320, 400, 480, 640, and 800. When both SSSG #1 and SSSG #2 are configured, the timer value may be a common value for switching from SSSG #1 to SSSG #0 or from SSSG #2 to SSSG #0, and the timer value may be configured per BWP.

The DCI may provide codepoint mapping where a code corresponds to a particular configuration or operation. In a first case (Case 1) of PDCCH skipping, M=1, a 1-bit field in a scheduling DCI. In this case, a codepoint 0 corresponds to the Beh 1 and a codepoint 1 corresponds to Beh 1A for duration T, where T is time. In some examples of case 1, M=2 or 3, a 2-bit field in a scheduling DCI. A codepoint of 00 corresponds to Beh 1, codepoint 01 corresponds to Beh 1A for duration T1 (a first time period), codepoint 10 corresponds to Beh 1A for duration T2 (a second time period), and codepoint 11 corresponds to Beh 1A for duration T3 if M=3 and reserved if M=2.

In a second case (Case 2) of 2 SSSG switching, the codepoint may include a 1-bit field in a scheduling DCI. In this case, a codepoint 0 corresponds to the Beh 2 (SSSG #0) and a codepoint 1 corresponds to Beh 2A (SSSG #1). In a third case (Case 3) of 3 SSSG switching, the codepoint may include a 2-bit field in a scheduling DCI. In this case. A codepoint of 00 corresponds to Beh 2 (SSSG #0), codepoint 01 corresponds to Beh 2A (SSSG #1), codepoint 10 corresponds to Beh 2B (SSSG #2), and codepoint 11 corresponds to reserved.

In a fourth case (Case 4) of 2 SSSG switching with PDCCH skipping, the codepoint may be M=1, a 1-2 bit field in a scheduling DCI. In this case, a codepoint of 00 corresponds to Beh 2 (SSSG #0), codepoint 01 corresponds to Beh 2A (SSSG #1), codepoint 10 corresponds to Beh 1A for duration T, and codepoint 11 corresponds to reserved. In some examples, the codepoint may be M=2, a 2 bit field in a scheduling DCI. In this case, a codepoint of 00 corresponds to Beh 2 (SSSG #0), codepoint 01 corresponds to Beh 2A (SSSG #1), codepoint 10 corresponds to Beh 1A for duration T1 (first duration), and codepoint 11 corresponds to Beh 1A for duration T2 (second duration).

In a fifth case (Case 5) of 3 SSSG switching with PDCCH skipping (no consensus), the codepoint may be M=1 including a 2 bit field in a scheduling DCI. In this case, a codepoint of 00 corresponds to Beh 2 (SSSG #0), codepoint 01 corresponds to Beh 2A (SSSG #1), codepoint 10 corresponds to Beh 2B (SSSG #2), and codepoint 11 corresponds to Beh 1A for duration T.

The indication of PDCCH monitoring adaption may be provided in scheduled DCI formats. A non-fallback scheduling DCI formats (format 0_1/1_1/0_2/1_2) may be used for the adaption indication. For at least a single component carrier (CC), self-scheduling may be implemented, and up to 2 bit indication may be supported. A new indication field may be used for the indication. An implicit indication may include a scheduling request (SR) and a RACH (RAN2 aspects), where the UE 115-*a* may not consider PDCCH skipping on each serving cell of the corresponding configured grant (CG) while the SR is pending. If PDCCH skipping is applied to RNTI(s) monitored during a random access response (RAR)/message (MsgB) window, the UE 115-*a* may not consider PDCCH skipping on a special cell (SpCell). The UE may not consider PDCCH skipping on SpCell while a contention resolution timer is executing. In some examples, the PDCCH skipping may be canceled or not considered during the RAR/MsgB window and contention resolution. For PDCCH monitoring adaptation for multiple CCs, the PDCCH monitoring adaptation may be applied to the individual scheduling cell (for self- and cross-carrier scheduling). In some examples, a single DCI indicating PDCCH monitoring adaptation for multiple cells may not supported.

Figure 3:
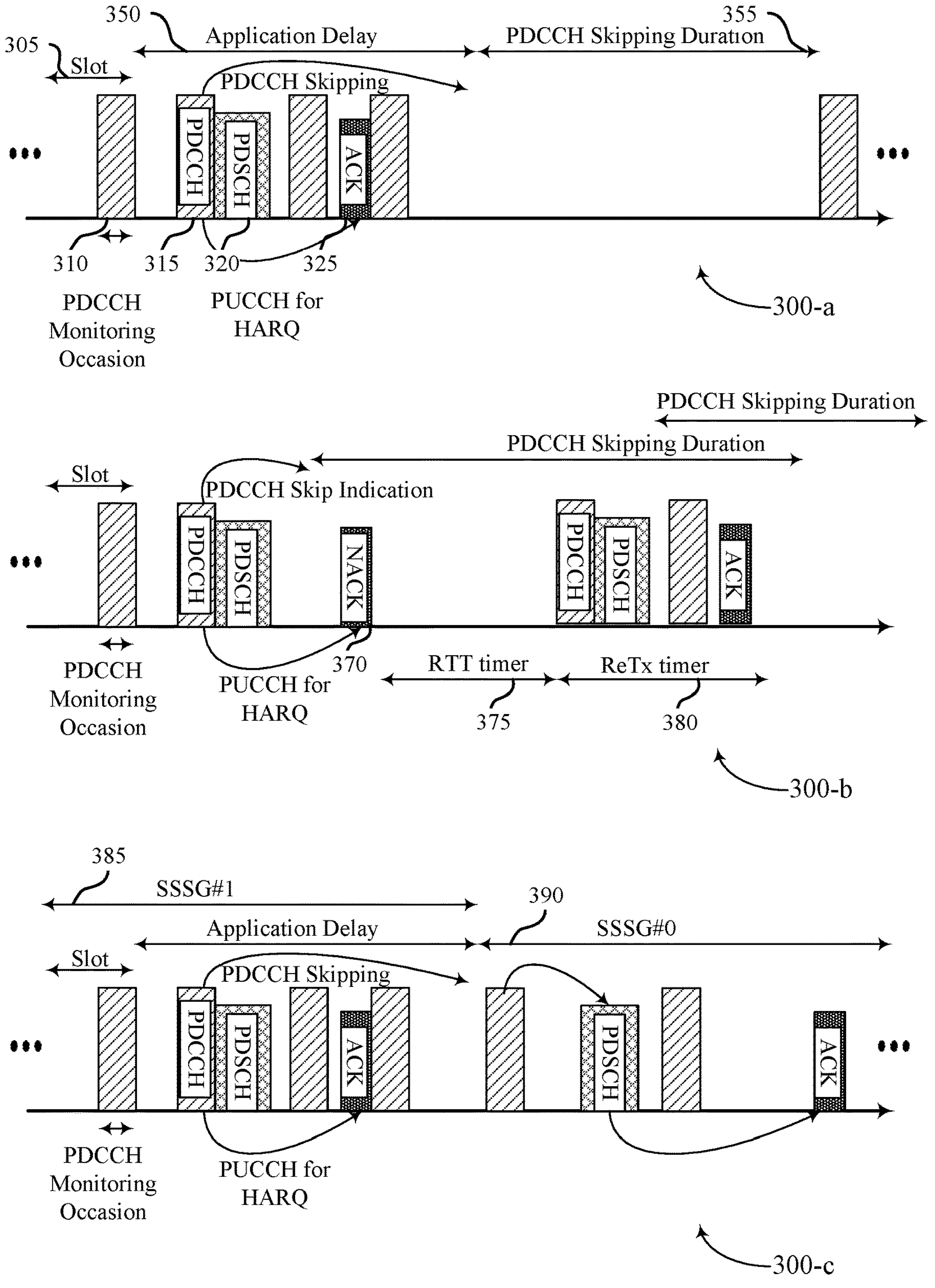
FIG. 3 illustrates an example of application delay adaptations that supports enhancements to PDCCH monitoring and skipping in accordance with one or more aspects of the present disclosure.

FIG. 3 illustrates an example of application delay adaptations 300 that support enhancements to PDCCH monitoring and skipping in accordance with one or more aspects of the present disclosure. The application delay adaptations 300 may include a first application delay adaptation 300-*a*, a second application delay adaptation 300-*b*, and a third application delay adaptation 300-*c*. The application delay adaptations 300 may implement or may be implemented by aspects of the wireless communications system 100 or the wireless communications system 200. In the first application delay adaptation 300-*a*, during a first slot 305, a PDCCH monitoring occasion 310 may occur for the UE 115 to monitor. For one or more of various triggering reasons, the UE 115 may receive a message to perform a PDCCH skipping for a duration in a PDCCH skipping duration 355. However, the UE 115-*a* may be configured to apply an application delay 350 to extend the time before performing the PDCCH skipping in the PDCCH skipping duration 355.

The UE 115 may start skipping the PDCCH monitoring occasions 310 after the application delay 350 after reception of the PDCCH DCI 315 (e.g., DCI format) (e.g., skip monitoring any PDCCH monitoring occasions that occur within the PDCCH skipping duration 355). The PDCCH DCI 315 may also schedule a data channel transmission in a physical downlink shared channel (PDSCH) 320. For example, upon detection of the PDCCH DCI 315 indicating PDCCH skipping (Beh 1A) on an active BWP of a serving cell, UE 115 may apply Beh 1A at the first slot 305 after the last symbol of the PDCCH DCI 315. The first application delay adaptation 300-*a* may be based on a time to receive the data channel transmission scheduled by the PDCCH DCI 315 and prepare and transmit HARQ feedback for the data channel transmission, for example, based on an acknowledgement (ACK) message 325. In some examples, the PDCCH skipping duration 355 may be delayed or started earlier (e.g., positive and negative time applied).

However, as shown in the second application delay adaptation 300-*b*, if the UE 115 begins skipping PDCCH monitoring occasions 310 after transmitting a NACK 370, the UE 115 may miss the PDCCH DCI 315 that carries the DCI scheduling a retransmission of the data channel transmission in response to the NACK 370, due to the UE 115 skipping monitoring for PDCCH monitoring occasion within the PDCCH skipping time duration. Additionally, in some cases, HARQ feedback may not be used, for example due to latency demands for a particular communication or due to power saving modes at the UE 115. Accordingly, skipping monitoring or switching based on the application delay 350 may result in increased latency or power consumption at the UE 115. Thus, the second application delay adaptation 300-*b* may benefit from delaying the PDCCH skipping duration 355 to ensure receiving the retransmission of the data channel transmission, as well as to reduce the application delay to start the PDCCH skipping to reduce latency. In some examples, the PDCCH skipping durations 355 may be based on a round trip timer (RTT) 375 that measures the time between initiating a network request and receiving a response (e.g., minimum amount of time before a downlink (DL) HARQ retransmission is expected at the UE 115). In some examples, the PDCCH skipping duration 355 is based on a retransmission timer (ReTx) 380 that includes the time to retransmit data that was previously negatively acknowledged in a NACK 370.

As shown in the third application delay adaptation 300-*c*, the adaptation may be used for switching SSSGs from the SSSG #1 385 to the SSSG #0 (default SSSG) 390. For SSSG switching, upon detection of the PDCCH DCI 315 indicating PDCCH skipping in the PDCCH skipping duration 355 (Beh 2/2A/2B) on an active BWP of a serving cell, the UE 115 may apply Beh 2/2A/2B at the first slot 305 that is at least $P_{switch}$ symbols, where P is a quantity of symbol, after the last symbol of the PDCCH DCI 315. When an SSSG timer expires, the UE applies Beh 2 (SSSG #0) 390 in a slot 305 not before the $P_{switch}$ symbols after the slot 305 where the timer expires. When an SSSG timer expires, the UE applies Beh 2 (SSSG #0) 390 in a slot 305 not before the end of PDCCH skipping duration 355, if the PDCCH skipping is indicated before the timer expires. During the application delay 350 (either by DCI indication or timer expiration), the UE 115 may not expect to receive another PDCCH DCI 315 indicating a different SSSG or PDCCH skipping.

At μ of 0, where p is an index into a table with which the UE 115 may be signaled by the network entity or otherwise may be configured, the minimum value for $P_{switch}$ for UE processing capability 1 (symbols) may be 25 and the minimum value for $P_{switch}$ for UE processing capability 2 (symbols) may be 10. At μ 1, the minimum value for $P_{switch}$ for UE processing capability 1 (symbols) may be 25 and the minimum value for $P_{switch}$ for UE processing capability 2 (symbols) may be 12. At μ 2, the minimum value for $P_{switch}$ for UE processing capability 1 (symbols) may be 25 and the minimum value for $P_{switch}$ for UE processing capability 2 (symbols) may be 22. At μ 3, the minimum value for $P_{switch}$ for UE processing capability 1 (symbols) may be 40. At μ 4, the minimum value for $P_{switch}$ for UE processing capability 1 (symbols) may be 160. At μ 5, the minimum value for $P_{switch}$ for UE processing capability 1 (symbols) may be 320.

The UE 115 may apply the application delay 350 and then apply PDCCH skipping duration 355 or SSSG switch. If the application delay 350 is a short duration, the retransmission of the transmission block if NACK may not happen. As a result, many delays may occur (large latency). The network entity 105-*a* may indicate extra time (e.g., based on block error rate or MCS measurement at the network entity 105 or knowledge of probability of NACK of current transmission) for UE 115 to delay, in the form of a dynamic application delay 350 or a delay added to the application delay 350. Similarly, for SSSG switching, the UE 115 may receive an indication to use particular SSSG after a given time (the application delay 350 or a delta time (A T) added or subtracted time to the application delay 350) based on the traffic arrival and power saving at the UE 115.

Modifying the application delay 350 may be based on an indication from the network entity 105-*a*, where sending the indication is based on a priority, a quality of service (QoS), or the delay parameter (e.g., remaining packet delay budget (PDB) of the packet). Modifying the application delay 350 may be based on the time or offset in DCI, configured using set of codepoints in RRC or a MAC control element (MAC-CE), and then selected in DCI. In some examples, modifying the application delay 350 may be based on a power profile at the UE 115, and the profile may be automated or known based on latest reported energy information. In some examples, modifying the application delay 350 may be based on decoding of the PDSCH associated with the scheduling DCI or based on whether the PDSCH of the scheduling DCI indicating SSSG or skipping is acknowledged. In some examples, modifying the application delay 350 may be based on an indication of a preferred application delay from the UE 115 (e.g., based on uplink traffic, UE energy/power conditions, etc.), and the indication may be based on uplink/downlink traffic and/or the UE requesting to be in a sleep mode or a power saving mode (e.g., because it has power below a threshold). The UE 115 may report one or more application delays or a delta application delay (e.g., delay amount to add or reduce). In some examples, modifying the application delay 350 may be based on an L1/L2 Priority and QoS and remaining PDB (if known at the UE 115) associated with the data scheduled by the DCI. The network entity 105-*a* may report remaining PDB of the packet in L1/L2/L3 including the scheduling DCI.

In some examples, the application delay 350 may be indicated using L1/L2/L3 indication including non-scheduling DCI, scheduling DCI before latest DCI, or scheduling DCI (PDCCH skipping/SSSG switch).

In some examples, for NR-U, DCI 2_0 (SFI DCI which is not scheduling DCI) can send an indication to perform a SSSG switch, wherein the non-scheduling DCI or other control message may be used to send both skipping and SSSG switch that allows for dynamic application delay. In some examples, the application delay 350 may fixed, however, the UE 115-*a* may be indicated with additional time. The time may be positive or negative time, such that the UE 115-*a* may sleep before the application delay 350 ends, saving more power for UE 115-*a*. In some examples, the application delay 350 may be based on a delta time adding to the application delay 350 through DCI. For example, the default application delay 350 may be used and the delta time is added based on new RNTI or new DCI. The UE 115 being indicated with conditional extension or modification of the application delay 350 for at least one of PDCCH skipping duration 355 or SSSG switch based on a decoding outcome or a power information or availability. In some examples, the power information may be unknown at the network entity 105. In such examples, the automated power behavior may be based on energy/power status/information including at least one of charging rate, discharging rate, energy level. In some examples, the power information may be known at the network entity 105. In such examples, the power information may be based on latest reported energy information to network entity 105-*a* that may be sent in an L1/L2/L3 indication or mux with L1/L2/L3 including HARQ-ACK of the PDSCH. In some examples, the UE 115 may be indicated to wait for a time T before applying PDCCH skipping or SSSG switch for a duration X or to end of DRX active time. This indication may be based on the network entity 105 requesting that the UE 115 to send the fully received PDSCH before the PDB expires. The additional time may be directly related to remaining PDB of the DL packet. If the remaining PDB is lower than the time of HARQ-ACK, this means HARQ-ACK feedback is canceled (i.e., implicit cancellation). The UE may flush the buffer (e.g., circular buffer) before RTT timer or retransmission (ReTx) timer. The indication of remaining PDB or time T may be one of PDCCH skipping by adding more bits or leveraging reserved bits, leveraging the PDCCH skipping duration if the skipping is on entire DRX active time, so a new RNTI or one or more bits (e.g., 1 bit) may be used, then the duration may be used for time before skipping rather than skipping duration, and adding more codepoints wherein some points are used for skipping and others are used for delaying.

In some examples, energy harvesting UEs 115 (ambient/zero power IoT devices), may lack energy at some time to transmit or receive or do any processing during a time interval. Accordingly, such devices may ask for a PDCCH skipping or SSSG switch during certain time due to lack of energy or due to being involved in energy harvesting cycle/duration that uses some sort of RF tuning or inability to process signals and perform energy harvesting. In some examples, the UE 115 may request for PDCCH skipping during a particular duration or request a particular SSSG index based on a preference. The index may be based on a function of power saving mode or sleep mode or power availability at the UE 115.

The indication from the UE 115 may include skipping for uplink (UL) transmissions on one or more UL channels, or skipping DL transmissions on one or more DL channels. The indication may be sent on an L1/L2/L3 (User assistance information (UAI) which is an RRC signal) or multiplexed with signals on L1/L2/L3 (scheduling request, buffer status report (BSR), channel state information (CSI) report, HARQ-ACK, RACH, PHR), dedicated resources (dynamic) or configured resources through scheduling or non-scheduling DCI or RRC/MAC-CE. If the UE receives or transmits more data and requests to cancel the skipping or to not comply with the indication (e.g., ignore indication), the UE 115 may send a "continue serving me" indication or cancellation of the PDCCH skipping, or switch to a default SSSG or other predetermined SSSG. This indication may be multiplexed with SR, BSR, HARQ-ACK, RACH, PHR, CSI. The multiplexing with HARQ-ACK, CSI, SR, BSR, PHR, may occur after receiving a PDCCH skipping duration 355 or SSSG switch from the network entity 105 or may be after a request from the UE 115. The multiplexing may occur within a time window from a request from the UE 115. In some examples, application delay for PDCCH skipping or switch time/application delay for SSSG may be different, and the values for any of these delays may be zero. For SSSG switch, in some cases, the application delay/switch time maybe be a function of current SSSG and new SSSG. In some cases, application delay may be zero for PDCCH skipping and there may be tables for SSSG switching that indicate a switch time and/or app delay.

In some examples, the application delay, PDCCH skipping, or SSSG codebooks (or potential values) may depend on the DCI used to indicate the PDCCH skipping or SSSG switch (e.g., scheduling versus non-scheduling DCI or DCI format). In some examples, the application delay, PDCCH skipping, or SSSG codebooks (or potential values) may depend on the DRX configuration, where the DRX configuration may include active time duration and periodicity or DRX cycle duration). For example, there may be multiple DRX configurations, and for each configuration, there may be multiple parameters that may be used. Once a DRX configuration is used, the UE 115 may use those parameters associated with the used configuration, may select parameters from a set of parameters associated with the used configuration, or may report desired parameters to the network.

FIG. 4 illustrates an example of a codebook for multiplexing scheduling requests 400 that supports enhancements to PDCCH monitoring and skipping in accordance with one or more aspects of the present disclosure. The codebook for multiplexing scheduling request 400 may implement or may be implemented by aspects of the wireless communications system 100 or the wireless communications system 200. The multiplexed request may be data that is multiplexed with a scheduling request and that may correspond to an active SSSG1. In some examples, the multiplexed request 400 may be defined or stored in codebooks or tables. The codebooks or tables may be stated in a specification, configured using L1/L2/L3, or in a broadcast message. If there are multiple tables in specification, the network entity 105-*a* may indicate a particular code using L1/L2/L3 or via a broadcast message from the network entity 105-*a*.

In a scheduling request, the UE 115 may have new data on an empty buffer or the UE 115 may have data arrival to a buffer with higher priority than the current data. In such examples, the UE 115 may use the scheduling request (associated with one or more of the logic channel groups (LCGs) of the arrived data). The UE 115 may send a positive scheduling request in the form of a 1 bit indication in PUCCH 0. A negative scheduling request may be in the form of a "nothing signal." Depending on which SSSG is active at a time, the code indication from UE 115 has a different meaning, such as to stay or switch or switching from SSSG #1 to SSSG #2, and so forth.

Here, the SSSG #1 may be active. In some examples, the codebook entries of the 2 bits may correspond to the scheduling request and the SSSG. The UE 115 may operate in accordance with the multiplexed request 400, such as to send the scheduling request or not send the scheduling request (e.g., negative SR or positive SR), and whether to switch to a respective SSSG. In some codebooks, for a given SSSG or for skipping, the contents of codebook or the codepoints may have different meaning or configurations. Some codebooks may store each variation with meaning or configurations for the codepoints but other codebooks may not. For example, for PDCCH skipping, the codebook and codepoints may be different depending on whether the UE 115 is within a PDCCH skipping duration or outside the PDCCH skipping duration (e.g., interval). If the UE 115 is within a PDCCH skipping duration, then the skipping interval zero indicated by UE 115 to the network entity 105 may correspond to canceling or stopping the PDCCH skipping (after applying some time period which may be zero, a few symbols, or subsequent to 1 slot). If the indication from the UE 115 is outside the PDCCH skipping duration, then the skipping interval zero may have no meaning or mean that the UE 115 does not want PDCCH skipping. In some examples, the UE 115 may indicate one or more patterns of PDCCH skipping of time length X, SSSG X, for duration Y, skipping for Z length, an SSSG Y for duration L, and so forth. Such patterns may exist during a skipping or switching period T, where the UE 115 or the network entity 105 repeats the pattern until the period is complete or until another indication from the UE 115 or the network entity 105 based on UE 115. The network entity 105 may receive the UE request and send a sequence of DCIs or other signaling to apply the pattern. The indications may be L1/L2/L3 or multiplexed with L1/L2/L3 (including SR and the like). Some configurations (e.g., SR configurations) or some occasions may could be associated with particular codebook codepoints related to skipping, SSSG, or SSSG plus skipping, or a pattern or the skipping and SSSG. The signals used for multiplexing may include a response to a UE WUS or a cell WUS.

FIG. 5 illustrates an example of a codebook for multiplexing scheduling requests 500 that supports enhancements to PDCCH monitoring and skipping in accordance with one or more aspects of the present disclosure. The codebook for multiplexing scheduling request may implement or may be implemented by aspects of the wireless communications system 100 or the wireless communications system 200.

In this example, the SSSG #1 is active. No scheduling request may correspond to SR=negative SR, and 2 bits may be used for SSSG jointly encoded with a positive scheduling request. Different CS may be used if PUCCH 0 is used for the scheduling request. In some examples, 3 SSSGs may be active to select from (one selected at a time and 2 for switch). Accordingly, one codepoint may be removed.

FIG. 6 illustrates an example of a codebook for multiplexing scheduling requests 600 that supports enhancements to PDCCH monitoring and skipping in accordance with one or more aspects of the present disclosure. The codebook for multiplexing scheduling request may implement or may be implemented by aspects of the wireless communications system 100 or the wireless communications system 200.

In this example, the SSSG #0 is active and may otherwise operate similar to the multiplexed request 500 of FIG. 5. For example, any switching may occur on SSSG #1 or SSSG #2.

FIG. 7 illustrates an example of a codebook for multiplexing scheduling requests 700 that supports enhancements to PDCCH monitoring and skipping in accordance with one or more aspects of the present disclosure. The codebook for multiplexing scheduling request may implement or may be implemented by aspects of the wireless communications system 100 or the wireless communications system 200. In this example, the SSSG #1 is active and may otherwise operate similar to the multiplexed request 500 of FIG. 5. For example, any switching may occur on SSSG #0 or SSSG #2.

FIG. 8 illustrates an example of a codebook for multiplexing scheduling requests 800 that supports enhancements to PDCCH monitoring and skipping in accordance with one or more aspects of the present disclosure. The codebook for multiplexing scheduling request may implement or may be implemented by aspects of the wireless communications system 100 or the wireless communications system 200. In this example, the SSSG #2 is active and may otherwise operate similar to the multiplexed request 500 of FIG. 5. For example, any switching may occur on SSSG #0 or SSSG #1.

FIG. 9 illustrates an example of a codebook for multiplexing scheduling requests 900 that supports enhancements to PDCCH monitoring and skipping in accordance with one or more aspects of the present disclosure. The codebook for multiplexing scheduling request may implement or may be implemented by aspects of the wireless communications system 100 or the wireless communications system 200. In this example, additional bits may be used for the scheduling request or for any other multiplexed signal for the UE 115. The scheduling request may extend to more than 1 bit. In some examples, 1 bit may correspond to the scheduling request and 2 bits may correspond to the SSSG. The coding may be encoded into different sequences (e.g., different CSs). The techniques described herein may also or alternatively apply to PDCCH skipping and its duration and may utilize coding (e.g., bits for coding).

FIG. 10 illustrates an example of a codebook for multiplexing scheduling requests 1000 that supports enhancements to PDCCH monitoring and skipping in accordance with one or more aspects of the present disclosure. The codebook for multiplexing scheduling request may implement or may be implemented by aspects of the wireless communications system 100 or the wireless communications system 200. In this example, additional bits may be used for the scheduling request or for any other multiplexed signal for the UE 115. The scheduling request may extend to more than 1 bit. In some examples, 1 bit may correspond to the scheduling request and 2 bits may correspond to the SSSG. The coding may be encoded into different sequences (e.g., different CSs). The techniques described herein may also or alternatively apply to PDCCH skipping and its duration and may utilize coding (e.g., bits for coding). The codes may also indicate stopping or canceling PDCCH monitoring for a duration.

FIG. 11 illustrates an example of a codebook for multiplexing scheduling requests 1100 that supports enhancements to PDCCH monitoring and skipping in accordance with one or more aspects of the present disclosure. The codebook for multiplexing scheduling request may implement or may be implemented by aspects of the wireless communications system 100 or the wireless communications system 200. In this example, the multiplexed request is multiplexed with BSR. The reservation bits may be used in BSR or for truncated BSR, to send the SSSG index. The network entity 105-*a* may indicate which LCG identification (ID) to use for the indication, for example, in 1 bit. In some examples, unused one or more LCG IDs may be used for indications (i.e., when LCG ID bit is 0, the UE 115 may use particular LCG ID BSR field to indicate SSSG index).

In some examples, a short BSR and a short truncated BSR may include 8 bits, where 3 bits are used for LCG ID and 5 bits are used for the BSR. The difference between Short BSR and Short Truncated that Short BSR provides information when only a single LCG has data to transfer, whereas the Short Truncated LCG provides information regarding the LCG including the highest priority Logical Channel when multiple LCG have data to transfer. The structure of a Long BSR and a Long Truncated BSR (e.g., MAC-CE) may have the same format but with a different sizes. The first byte may represent the LCG ID and other part represent the BSR. The Long BSR and Long Truncated BSR may use 8 bits for 256 indices (e.g., $2^8=256$ indices) that may accommodate a larger buffer status of 81338368 bytes.

FIG. 12 illustrates an example of a codebook for multiplexing scheduling requests 1200 that supports enhancements to PDCCH monitoring and skipping in accordance with one or more aspects of the present disclosure. The codebook for multiplexing scheduling request may implement or may be implemented by aspects of the wireless communications system 100 or the wireless communications system 200. In this example, the indication may be multiplexed with a HARQ-ACK signal for the UE 115. In some codes, the code bits may correspond to a "nothing point" to indicate one codepoint (e.g., NACK or ACK with an SSSG state). Here, the SSSG #2 may be active so that the switching occurs on SSSG #0 and SSSG #1.

FIG. 13 illustrates an example of a codebook for multiplexing scheduling requests 1300 that supports enhancements to PDCCH monitoring and skipping in accordance with one or more aspects of the present disclosure. The codebook for multiplexing scheduling request may implement or may be implemented by aspects of the wireless communications system 100 or the wireless communications system 200. In this example, the indication may be multiplexed with a HARQ-ACK signal for the UE 115. The code bits may include 3 bits.

FIG. 14 illustrates an example of a codebook for multiplexing scheduling requests 1400 that supports enhancements to PDCCH monitoring and skipping in accordance with one or more aspects of the present disclosure. The codebook for multiplexing scheduling request may implement or may be implemented by aspects of the wireless communications system 100 or the wireless communications system 200. In this example, the indication may be multiplexed with a HARQ-ACK signal for the UE 115. In the depicted code index, the X and Y correspond to L1/L2/L3 (e.g., RRC/MAC-CE/DCI) configured.

In some examples, an ACK on PDCCH may take place where the UE 115 may respond (if PDCCH skipping is based on request from UE 115), and the UE 115 may respond with a canceling request or confirming request for this type of PDCCH skip or SSSG switch. No response may be considered a confirmation of skipping. The PDCCH may be sent over L1/L2/L3 or multiplexed and over L1/L2/L3. In some examples, the UE 115 may request PDCCH skipping or SSSG switching, the network entity 105-*a* may send the PDCCH skipping or SSSG switching, and the UE 115-*a* may respond to this message from the network entity 105-*a*.

Based on UE 115-*a* response, the network entity 105-*a* or the UE 115 may define a behavior, Beh. The Beh may be defined to remain in the same SSSG and cancel skipping, moving to another SSSG (defined between the network entity 105-*a* and the UE 115). The UE 115 response may be to cancel, modify, or approve. In some examples, the request may be multiplexed with HARQ-ACK of the PDSCH scheduled by the PDCCH skipping or retransmission. This communication of the request and response may be communicated over L1.

In some examples, the request for skipping or switching and/or the PDCCH skipping cancellation or modification request may sent over a defined time frame (e.g., defined time window). The UE 115-*a* may begin to move to a new SSSG or skip immediately after the application delay (or indicated time) or after last ACK/NACK of last PDSCH.

In some examples, a control message, such as a power headroom MAC control element, may include an octet of data that includes one or more reserved bits R and one or more bits to indicate power headroom (PH). For SSSG and/or PDCCH skipping, two R bits may be used to indicate the SSSG index or PDCCH skipping configuration. Bits 00 may indicate SSSG index 0, bits 01 may indicate SSSG index 1, bits 10 may indicate SSSG index 2, and bits 11 may indicate SSSG index 3 or may be unused. Similar bit configuration may be used for PDCCH skipping. Codepoints may be associated with PDCCH skipping and the SSSG index, where there could be some codepoints for PDCCH skipping and others for indicating an SSSG index.

In some examples, ambient IoT devices, zero power devices, energy harvesting (EH) devices, or otherwise low power devices may not have many power levels or granularity and might have few low power levels (so that a UE maximum output power (PCMAX) and PHR will change). Accordingly, using multiple power states (e.g., 64 states) might be inefficient. Down sampling (every other row or few rows) or specific rows may be used (e.g., rows associated with low power levels). The UE may transmit a control message including an octet having a set of R bits, a set of bits for indicating SSSG/PDCCH skipping, and power information. In some examples, such as for 8 bit states, the states may include R bits, and 6 bits may be split into sets of bits for SSSG/PDCCH skipping configuration/index or for PHR (or PCMAX, c (serving cell), f (carrier)). In an example, the R bits may be used to indicate the SSSG/PDCCH skipping indication, which may be represented by 2 bits. In some examples, the octet may not include the R bits, and instead the bits of the octet may be split between a first set of bits for indicating SSSG/PDCCH skipping, and a second set of bits for indicating one or both of PHR and PCMAX_c,f.

The indication to use and which signal to multiplex may be determined by the network entity 105-*a* under one or more conditions. The network entity 105-*a* may determine using L1/L2/L3 indications to allow multiplexing or not allowing multiplexing, and which signals to use for multiplexing. The network entity 105-*a* may send a signal indicating PDCCH skipping then use particular SSSG. The UE 115-*a* may indicate preference of PDCCH skipping and of SSSG index. The network entity 105-*a* may select accordingly. The preference from the UE 115-*a* may be in the form of multiple PDCCH skipping durations and SSSG indices. The network entity 105-*a* may select an index for the PDCCH skipping and an index for the SSSG switching.

Figure 15:
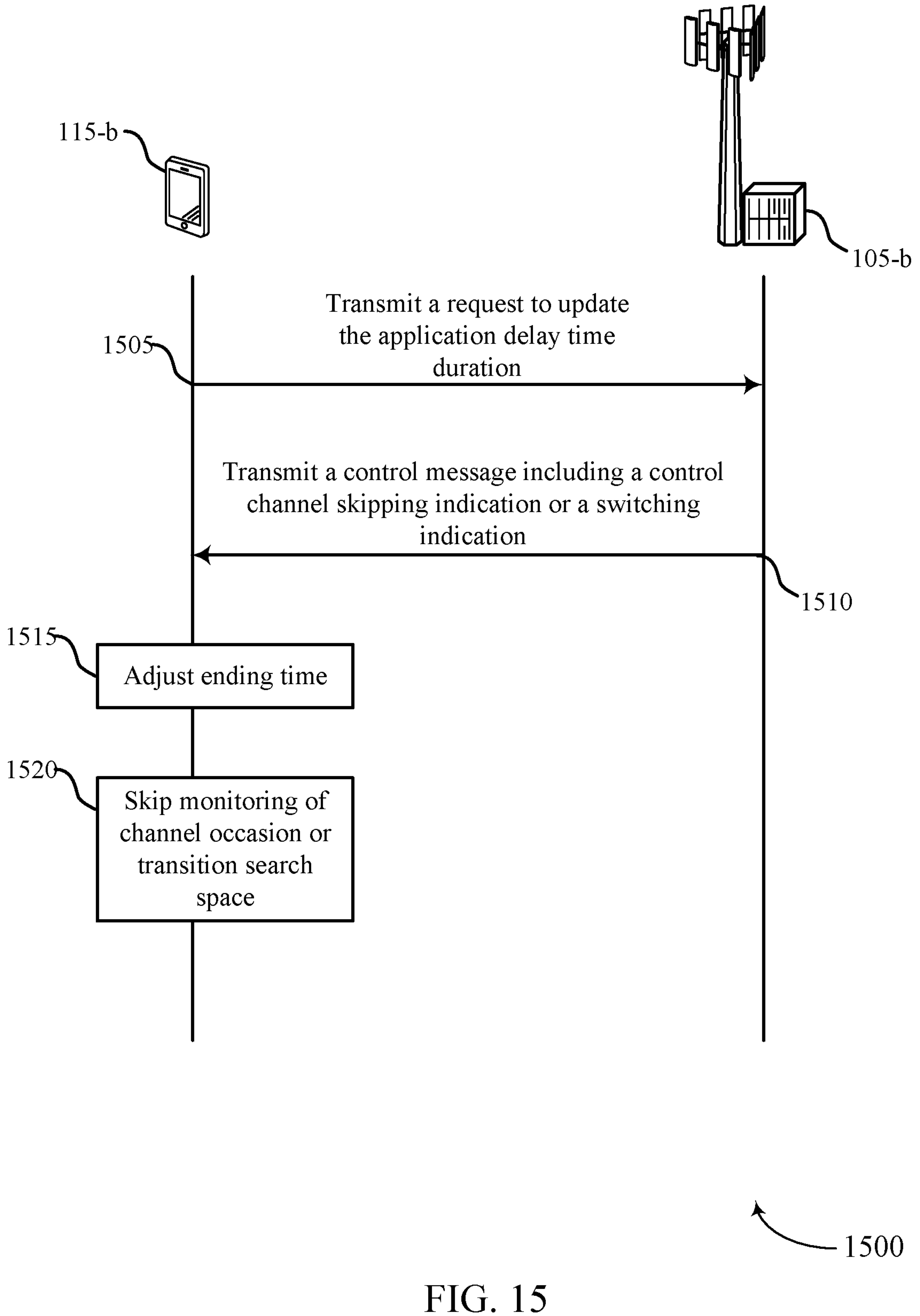
FIG. 15 illustrates an example of a process flow that supports enhancements to PDCCH monitoring and skipping in accordance with one or more aspects of the present disclosure.

FIG. 15 illustrates an example of a process flow 1500 that supports enhancements to PDCCH monitoring and skipping in accordance with one or more aspects of the present disclosure. For example, the process flow 1500 may include a UE 115-*b*, which may be an example of a UE 115 as described herein. The process flow 1500 may include a network entity 105-*b*, which may be an example of a network entity 105 as described herein. In the following description of the process flow 1500, the operations performed by the network entity 105-*b* and the UE 115-*b* may be performed in different orders or at different times than the exemplary order shown. Some operations may also be omitted from the process flow 1500, or other operations may be added to the process flow 1500.

In some examples, at 1505, the UE 115-*b* may transmit a request to update the application delay duration. As described herein, the application delay for an SSSG switch may be different from the application delay for skipping PDCCH monitoring occasions. In some examples, the application delay for an SSSG switch or for skipping PDCCH monitoring may be zero. At 1510, the network entity 105-*b* may transmit a control message to the UE 115-*b*. The control message may include a control channel (e.g., PDCCH) skipping indication or a switching indication. The control channel skipping indication or the switching indication may be associated with an application delay time duration that indicates a beginning of a control channel skipping time duration or a beginning time for a SSSG switch. In some examples, the network entity 105-*b* may also transmit an indication of an update to the application delay time duration, and adjusting the ending time of the application delay time duration is based on the update. In some examples, the indication of the update to the application delay time duration is responsive to the request at 1505. In some examples, for SSSG switching, the application delay (e.g., the switch time) may be a function of the current SSSG and the new SSSG. For example, tables may define SSSG application delays for switches between different SSSGs.

At 1515, the UE 115-*b* may adjust an ending time of the application delay time duration based on feedback indicating whether a message was successfully received via a data channel. In some examples, adjusting the ending time of the application delay time duration is based on at least one of a power condition at the UE 115-*b*, a traffic information at the UE 115-*b*, a downlink traffic indication, and/or a decoding status of data packets at the UE 115-*b*. In some examples, adjusting the ending time of the application delay time duration is based on traffic information or condition at UE (e.g., traffic inter-packet arrival time or density of traffic, L1 and L2 priority, QoS, traffic type [e.g., XR, URLLC, etc.]), traffic condition of data transmitted to UE (e.g., downlink traffic which is known at Tx side, e.g., gNB), decoding status of the packets at the UE, or any combination thereof. In some examples, adjusting the ending time of the application delay time duration is based at least in part on transmission of the report indicating at least part of the power condition at the UE, knowledge about traffic at the UE by the network entity, ACK/NACK feedback, power information, UL traffic condition, or any combination thereof.

In some examples, adjusting the ending time of the application delay time duration is based on an ending time of an active period of a DRX cycle at the UE 115-*b*. The network entity 105-*b* may provide known or measured information about UL traffic, and in some examples, this information may come from UE reports using L1/L2/L3 indications across a time frame. In some examples, the message may be a data channel message (e.g., a PDSCH) scheduled by the control message (e.g., a DCI) that includes the control channel skipping indication or the switching indication.

In some examples, the UE 115-*b* may transmit, to the network entity 105-*b*, a feedback message indicating unsuccessful decoding of the message. The adjusting of the ending time of the application delay time duration may be based on transmission of the feedback message. The UE 115-*b* may receive, from the network entity 105-*b*, an indication of a PDB or a priority associated with the message. Adjusting the ending time of the application delay time duration may be based on the PDB or the priority associated with the message.

In some examples, the UE 115-*b* may cancel transmission of a feedback message for the message based on a remainder of the PDB being less than a threshold. Adjusting the ending time of the application delay time duration may be based on cancelling transmission of the feedback message.

In some examples, the UE 115-*b* may transmit, to the network entity 105-*b*, a report indicating the power condition at the UE 115-*b*. Adjusting the ending time of the application delay time duration may be based on transmission of the report indicating at least a portion of the power condition at the UE 115-*b*, the traffic information at the UE 115-*b*, or the decoding status of the data packets at the UE 115-*b*.

At 1520, the UE 115-*b* may skip monitoring of one or more control channel occasions (e.g., PDCCH occasions), or transitioning from a first SSSG to a second SSSG, beginning at the adjusted ending time of the application delay time duration. In some examples, the UE 115-*b* may transmit the request via one or more of at least one of a dedicated resource for data transmission (e.g., multiplexed with PUSCH), a dedicated resource for control transmission (e.g., transmission on a dedicated PUCCH resource or PUSCH resource), a scheduling request, a buffer status report, a channel state information report, a HARQ feedback message, a RACH message, a transmission end of burst indication from the UE 115-*b* (e.g., in a MAC CE, or in a physical signal such as uplink control information to the network entity carried on PUCCH or PUSCH, or in a L3 signal such as RRC or UAI which is RRC), a UAI, or a PHR. In some examples, the UE 115-*b* may receive an indication of a configuration for requesting to perform control channel skipping or to switch the active SSSG. The transmission of the request is in accordance with the configuration. The UE 115-*b* may transmit, to the network entity 105-*b*, an acknowledgement message confirming the control channel skipping indication or the switching indication. The skipping may involve monitoring of one or more control channel occasions or transitioning from the first SSSG to the second SSSG based on the acknowledgment message. The UE 115-*b* may transmit, to the network entity 105-*b*, a request to update the control channel skipping indication or the switching indication, the request indicating the beginning of the control channel skipping time duration, the beginning time for the SSSG switch, or the second SSSG.

In some examples, sidelink or PC5 (e.g., direct communication) interfacing may be used for implementing the techniques described herein, for example, between the network entity 105-*b* that uses PC5 interface (e.g., programmable logic controller (PLC)) and the UE 115-*b*, or from the UE 115-*b* to another UE 115. The access network (Uu) link or interface may be used for implementing the techniques described herein, as well as new interfaces that may be defined for ambient IoT/zero power devices/or new devices.

This interfacing (e.g., new interfacing) may be composed of a communication system that may use a sinewave (single tone) or multi-tone (OFDM-based) waveform (RF waveforms) transmitted by a first device and reflected/backscattered by a second device, which may be an EH device. The first device may be the network entity 105-*b*, an IAB relay, a relay node, a RAN node, a gNB, a transmission/reception point (TRP) associated with the network entity 105-*b*, the sidelink UE 115-*b* (remote, primary, PLC, or a controlling unit in sidelink), or a Uu link UE 115 transmitted waveform or RF signals. The waveform generated by the first device may carry data signal (e.g., PDSCH, PDSCH, PSSCH, among other examples), a reference signal (e.g., CSI-RS, sounding reference signal (SRS), synchronization signal block (SSB), among other examples), or random data or reference signals/symbols across different sub-channels/resource elements. In some examples, the waveform may be sub-channels modulated OFDM signal/waveform or time-domain modulated OFDM-based signal/waveform. The communication signals in the new interface may refer to a modulated waveform/signal generated, based on the capability of the EH device, by the EH device. The waveform may be one of sinewave (single tone), multi-tone wave (e.g., OFDM-based waveform). In some examples, the modulation used may be on off keying (OOK), amplitude shift keying (ASK), frequency shift keying (FSK), phase shift keying (PSK), Zadoff Chu, DFT, Walsh/Hadamard, Gold, Reed-Solomon, m-sequence, Chirp, among other examples. In some examples, modulation may occur in time domain or frequency domain, or both. In some examples, Manchester coding may be used with ASK or OOK. In some example, forward error correction codes and other channel coding may be applied to achieve higher reliability.

In some aspects, the UE 115-*b* may use two different interfaces where a first interface is associated with high power mode (e.g., not to be in a low power saving mode), and the first interface may be associated with a Uu or PC5 like interfaces. A second interface (associated with same radio as the first interface with deactivation one or more on radio frequency/hardware/software/firmware components or with a separate radio (e.g., backscatter-based) radio similar to a tag (e.g., passive or semi-passive tag)) is used with the low to very low power saving modes (e.g., for when the UE is increasing the power saving). In some aspects, there may be association between interface and type of signal. For example, if the signal is low priority relative to data and particular signals, such as legacy UL signals (e.g., HARQ- ACK, CSI report, etc.), the second interface may be used. If the signal is high priority (e.g., particular data), the first interface may be used. In some cases, the network entity 105-*b* may assign different signals to different interfaces based on priority, QoS requirements, power saving at the network entity 105-*b* and at the UE 115-*b*, reported energy information at the UE 115-*b* (e.g., energy charging rate profile, discharging/power consumption rate profile, energy state/level profile), or based on UE preferences and traffic. For example, the UE 115-*b* may request for certain mapping between signals and interfaces using L1/L2/L3 signaling (dedicated or piggybacked/multiplexed with other signals)) and the network entity 105-*b* may configure using L1/L2/L3 signaling. The L3 or RRC signals may include UAI.

Figure 16:
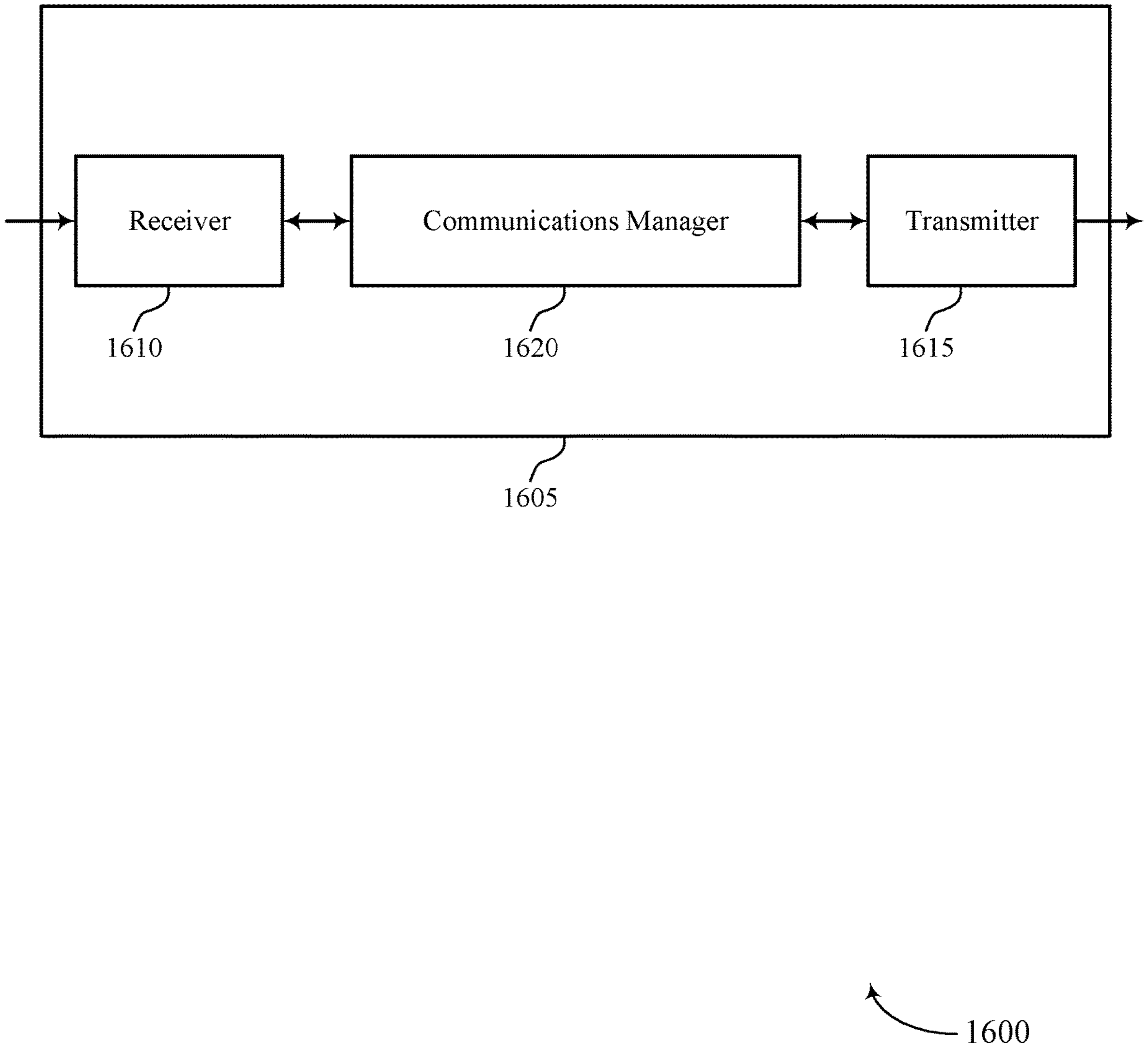
FIGS. 16 and 17 illustrate block diagrams of devices that support enhancements to PDCCH monitoring and skipping in accordance with one or more aspects of the present disclosure.

FIG. 16 illustrates a block diagram 1600 of a device 1605 that supports enhancements to PDCCH monitoring and skipping in accordance with one or more aspects of the present disclosure. The device 1605 may be an example of aspects of a UE 115 as described herein. The device 1605 may include a receiver 1610, a transmitter 1615, and a communications manager 1620. The device 1605 may also include one or more processors, memory coupled with the one or more processors, and instructions stored in the memory that are executable by the one or more processors to enable the one or more processors to perform the enhancements to PDCCH monitoring and skipping features discussed herein. Each of these components may be in communication with one another (e.g., via one or more buses).

The receiver 1610 may provide a means for receiving information such as packets, user data, control information, or any combination thereof associated with various information channels (e.g., control channels, data channels, information channels related to enhancements to PDCCH monitoring and skipping). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to enhancements to PDCCH monitoring and skipping). In some examples, the transmitter 1615 may be co-located with a receiver 1610 in a transceiver module. The transmitter 1615 may utilize a single antenna or a set of multiple antennas.

The communications manager 1620, the receiver 1610, the transmitter 1615, or various combinations thereof or various components thereof may be examples of means for performing various aspects of enhancements to PDCCH monitoring and skipping as described herein. For example, the communications manager 1620, the receiver 1610, the transmitter 1615, or various combinations or components thereof may support a method for performing one or more of the functions described herein.

In some examples, the communications manager 1620, the receiver 1610, the transmitter 1615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1620, the receiver 1610, the transmitter 1615, or various combinations or components thereof may be implemented in code (e.g., as communications management software or firmware) executed by a processor. If implemented in code executed by a processor, the functions of the communications manager 1620, the receiver 1610, the transmitter 1615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1620 may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communication at a UE in accordance with examples as disclosed herein. For example, the communications manager 1620 may be configured as or otherwise support a means for receiving, from a network entity, a control message including a control channel skipping indication or a switching indication, the control channel skipping indication or the switching indication being associated with an application delay time duration that indicates a beginning of a control channel skipping time duration or a beginning time for a SSSG switch. The communications manager 1620 may be configured as or otherwise support a means for adjusting an ending time of the application delay time duration based on feedback indicating whether a message was successfully received via a data channel. The communications manager 1620 may be configured as or otherwise support a means for skipping monitoring of one or more control channel occasions, or transitioning from a first SSSG to a second SSSG, beginning at the adjusted ending time of the application delay time duration.

By including or configuring the communications manager 1620 in accordance with examples as described herein, the device 1605 (e.g., a processor controlling or otherwise coupled with the receiver 1610, the transmitter 1615, the communications manager 1620, or a combination thereof) may support techniques for ensuring that data transmissions and retransmissions are received, as well as support reducing latency and power consumption at the UE 115 by timely starting PDCCH monitoring skipping or SSSG switching by considering whether data is to be received or not to be received (e.g., HARQ feedback).

Figure 17:
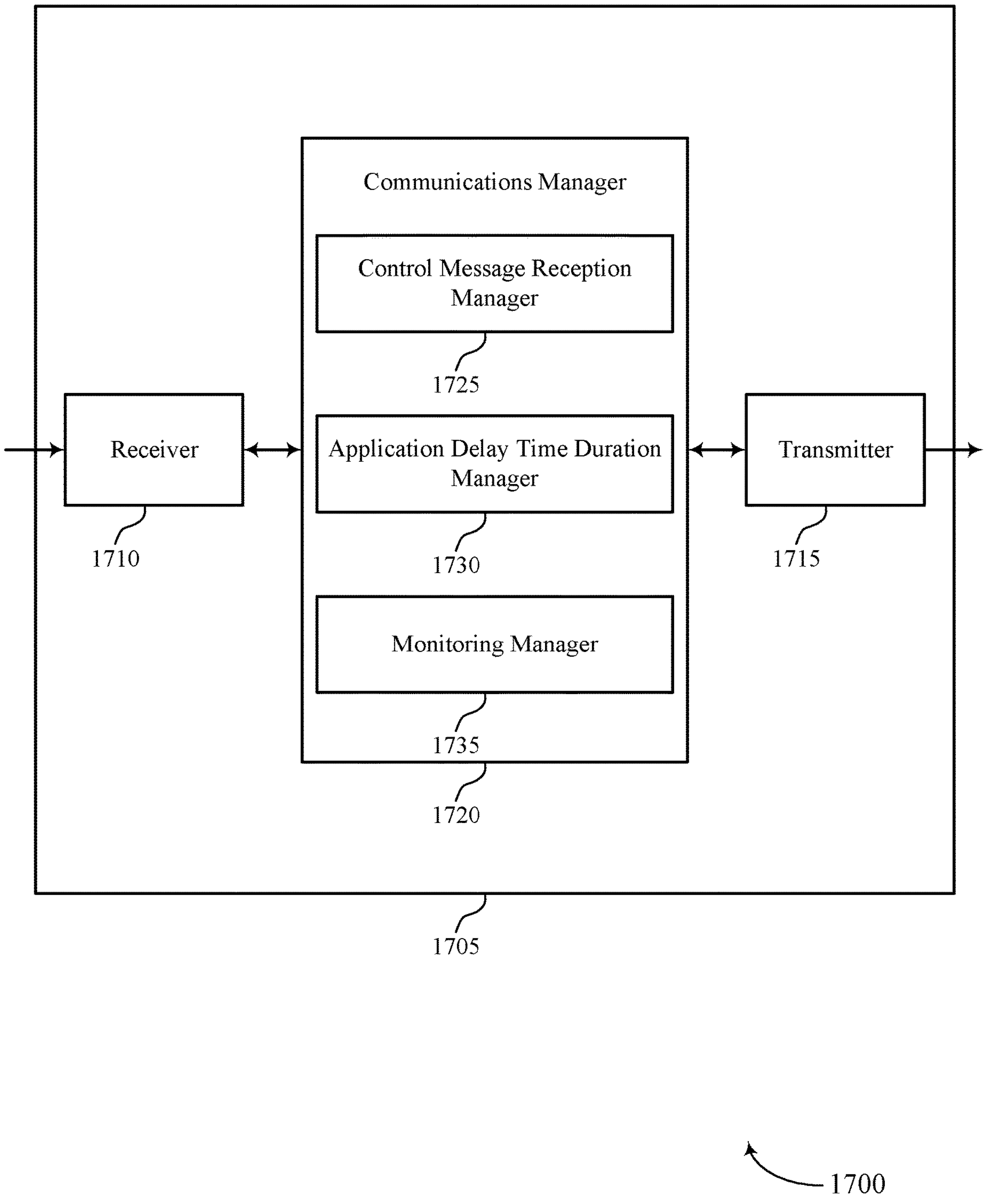

FIG. 17 illustrates a block diagram 1700 of a device 1705 that supports enhancements to PDCCH monitoring and skipping in accordance with one or more aspects of the present disclosure. The device 1705 may be an example of aspects of a device 1605 or a UE 115 as described herein. The device 1705 may include a receiver 1710, a transmitter 1715, and a communications manager 1720. The device

1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, information channels related to enhancements to PDCCH monitoring and skipping). Information may be passed on to other components of the device 1705. The receiver 1710 may utilize a single antenna or a set of multiple antennas.

The transmitter 1715 may provide a means for transmitting signals generated by other components of the device 1705. For example, the transmitter 1715 may transmit information such as packets, user data, control information, or any combination thereof associated with various information channels (e.g., control channels, data channels, information channels related to enhancements to PDCCH monitoring and skipping). In some examples, the transmitter 1715 may be co-located with a receiver 1710 in a transceiver module. The transmitter 1715 may utilize a single antenna or a set of multiple antennas.

The device 1705, or various components thereof, may be an example of means for performing various aspects of enhancements to PDCCH monitoring and skipping as described herein. For example, the communications manager 1720 may include a control message reception manager 1725, an application delay time duration manager 1730, a monitoring manager 1735, or any combination thereof. The communications manager 1720 may be an example of aspects of a communications manager 1620 as described herein. In some examples, the communications manager 1720, or various components thereof, may be configured to perform various operations (e.g., receiving, obtaining, monitoring, outputting, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to obtain information, output information, or perform various other operations as described herein.

The communications manager 1720 may support wireless communication at a UE in accordance with examples as disclosed herein. The control message reception manager 1725 may be configured as or otherwise support a means for receiving, from a network entity, a control message including a control channel skipping indication or a switching indication, the control channel skipping indication or the switching indication being associated with an application delay time duration that indicates a beginning of a control channel skipping time duration or a beginning time for a SSSG switch. The application delay time duration manager 1730 may be configured as or otherwise support a means for adjusting an ending time of the application delay time duration based on feedback indicating whether a message was successfully received via a data channel. The monitoring manager 1735 may be configured as or otherwise support a means for skipping monitoring of one or more control channel occasions, or transitioning from a first SSSG to a second SSSG, beginning at the adjusted ending time of the application delay time duration.

In some cases, the control message reception manager 1725, the application delay time duration manager 1730, and the monitoring manager 1735 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control message reception manager 1725, the application delay time duration manager 1730, and the monitoring manager 1735 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 18:
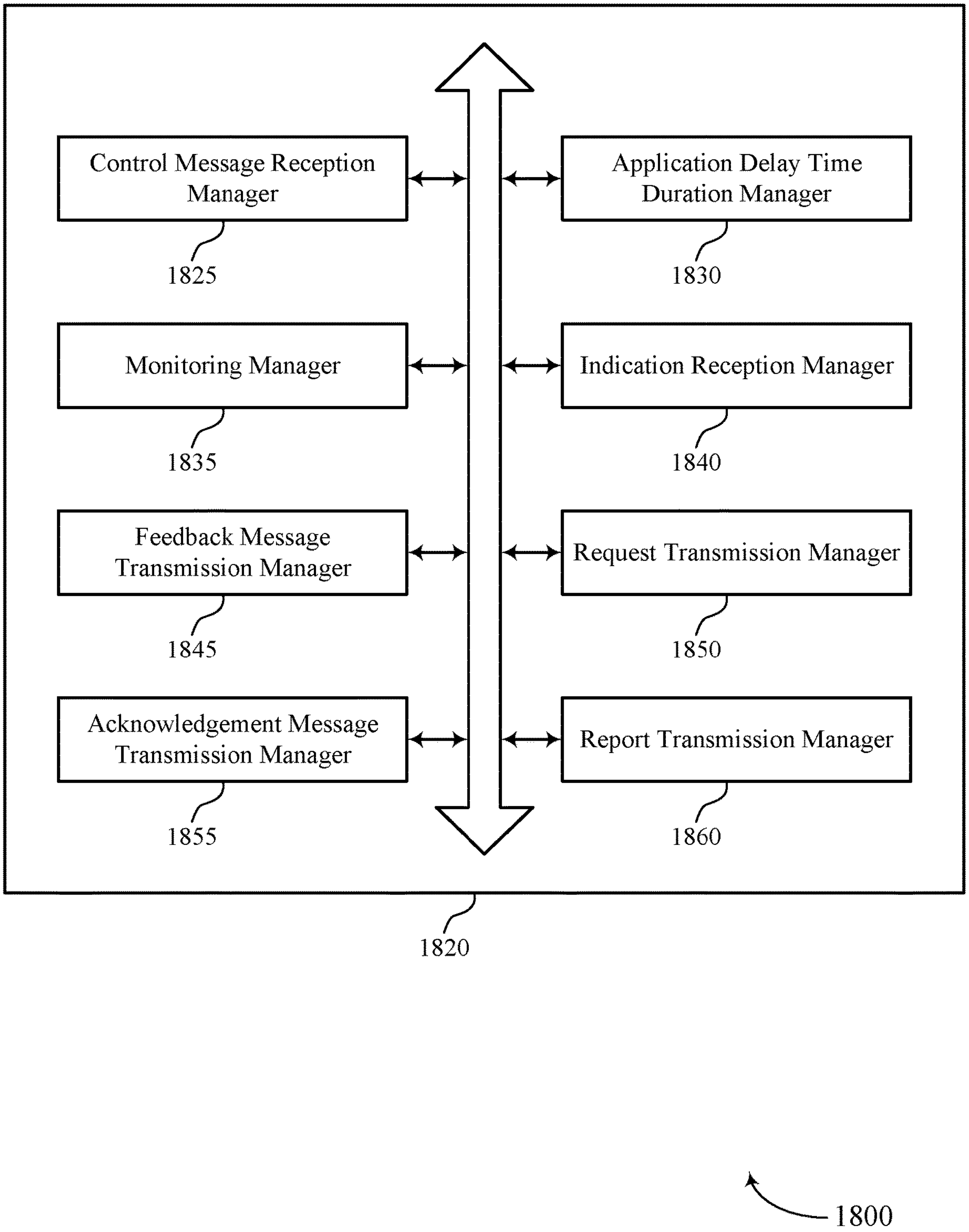
FIG. 18 illustrates a block diagram of a communications manager that supports enhancements to PDCCH monitoring and skipping in accordance with one or more aspects of the present disclosure.

FIG. 18 illustrates a block diagram 1800 of a communications manager 1820 that supports enhancements to PDCCH monitoring and skipping in accordance with one or more aspects of the present disclosure. The communications manager 1820 may be an example of aspects of a communications manager 1620, a communications manager 1720, or both, as described herein. The communications manager 1820, or various components thereof, may be an example of means for performing various aspects of enhancements to PDCCH monitoring and skipping as described herein. For example, the communications manager 1820 may include a control message reception manager 1825, an application delay time duration manager 1830, a monitoring manager 1835, an indication reception manager 1840, a feedback message transmission manager 1845, a request transmission manager 1850, an acknowledgement message transmission manager 1855, a report transmission manager 1860, or any combination thereof. Each of these components may communicate, directly or indirectly, with one another (e.g., via one or more buses).

The communications manager 1820 may support wireless communication at a UE in accordance with examples as disclosed herein. The control message reception manager 1825 may be configured as or otherwise support a means for receiving, from a network entity, a control message including a control channel skipping indication or a switching indication, the control channel skipping indication or the switching indication being associated with an application delay time duration that indicates a beginning of a control channel skipping time duration or a beginning time for a SSSG switch. The application delay time duration manager 1830 may be configured as or otherwise support a means for adjusting an ending time of the application delay time duration based on feedback indicating whether a message was successfully received via a data channel. The monitoring manager 1835 may be configured as or otherwise support a means for skipping monitoring of one or more control channel occasions, or transitioning from a first SSSG to a second SSSG, beginning at the adjusted ending time of the application delay time duration.

In some examples, the indication reception manager 1840 may be configured as or otherwise support a means for receiving, from the network entity, an indication of an update to the application delay time duration, where adjusting the ending time of the application delay time duration is based on the update.

In some examples, the request transmission manager 1850 may be configured as or otherwise support a means for transmitting, to the network entity, a request to update the application delay time duration, where the indication of the update to the application delay time duration is responsive to the request.

In some examples, to support receiving the indication of the update to the application delay time duration, the indication reception manager 1840 may be configured as or otherwise support a means for receiving the indication of the update to the application delay time duration via the control message.

In some examples, to support adjusting the ending time of the application delay time duration, the application delay time duration manager 1830 may be configured as or otherwise support a means for adjusting the ending time of the application delay time duration based on at least one of a power condition at the UE, a traffic information at the UE, a decoding status of data packets at the UE, or any combination thereof.

In some examples, the report transmission manager 1860 may be configured as or otherwise support a means for transmitting, to the network entity, a report indicating the power condition at the UE, where adjusting the ending time of the application delay time duration is based on transmission of the report indicating at least a portion of the power condition at the UE, the traffic information at the UE, the decoding status of the data packets at the UE, or any combination thereof.

In some examples, the feedback message transmission manager 1845 may be configured as or otherwise support a means for transmitting, to the network entity, a feedback message indicating unsuccessful decoding of the message, where adjusting the ending time of the application delay time duration is based on transmission of the feedback message.

In some examples, the indication reception manager 1840 may be configured as or otherwise support a means for receiving, from the network entity, an indication of a packet delay budget or a priority associated with the message, where adjusting the ending time of the application delay time duration is based on the packet delay budget or the priority associated with the message.

In some examples, the feedback message transmission manager 1845 may be configured as or otherwise support a means for cancelling transmission of a feedback message for the message based on a remainder of the packet delay budget being less than a threshold, where adjusting the ending time of the application delay time duration is based on cancelling transmission of the feedback message.

In some examples, to support adjusting the ending time of the application delay time duration, the application delay time duration manager 1830 may be configured as or otherwise support a means for adjusting the ending time of the application delay time duration based on an ending time of an active period of a DRX cycle at the UE.

In some examples, the request transmission manager 1850 may be configured as or otherwise support a means for transmitting, to the network entity, a request to perform control channel skipping during a time interval or to switch an active SSSG, where the control channel skipping indication or the switching indication is responsive to the request, and where the request is transmitted based on a trigger event.

In some examples, the trigger event includes at least one of power condition, an energy harvesting condition, a traffic condition, or any combination thereof.

In some examples, to support transmitting the request, the request transmission manager 1850 may be configured as or otherwise support a means for transmitting the request via one or more of at least one of a dedicated resource for data transmission, a dedicated resource for control transmission, a scheduling request, a buffer status report, a channel state information report, a HARQ feedback message, a random access channel (RACH) message, a transmission end of burst indication from the UE, a UAI, a PHR, or any combination thereof.

In some examples, the indication reception manager 1840 may be configured as or otherwise support a means for receiving an indication of a configuration for requesting to perform control channel skipping or to switch the active SSSG, where transmission of the request is in accordance with the configuration.

In some examples, the acknowledgement message transmission manager 1855 may be configured as or otherwise support a means for transmitting, to the network entity, an acknowledgment message confirming the control channel skipping indication or the switching indication, where the skipping monitoring of one or more control channel occasions or transitioning from the first SSSG to the second SSSG is based on the acknowledgment message.

In some examples, the request transmission manager 1850 may be configured as or otherwise support a means for transmitting, to the network entity, a request to update the control channel skipping indication or the switching indication, the request indicating the beginning of the control channel skipping time duration, the beginning time for the SSSG switch, or the second SSSG.

In some cases, the control message reception manager 1825, the application delay time duration manager 1830, the monitoring manager 1835, the indication reception manager 1840, the feedback message transmission manager 1845, the request transmission manager 1850, the acknowledgement message transmission manager 1855, and the report transmission manager 1860 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control message reception manager 1825, the application delay time duration manager 1830, the monitoring manager 1835, the indication reception manager 1840, the feedback message transmission manager 1845, the request transmission manager 1850, the acknowledgement message transmission manager 1855, and the report transmission manager 1860 discussed herein.

Figure 19:
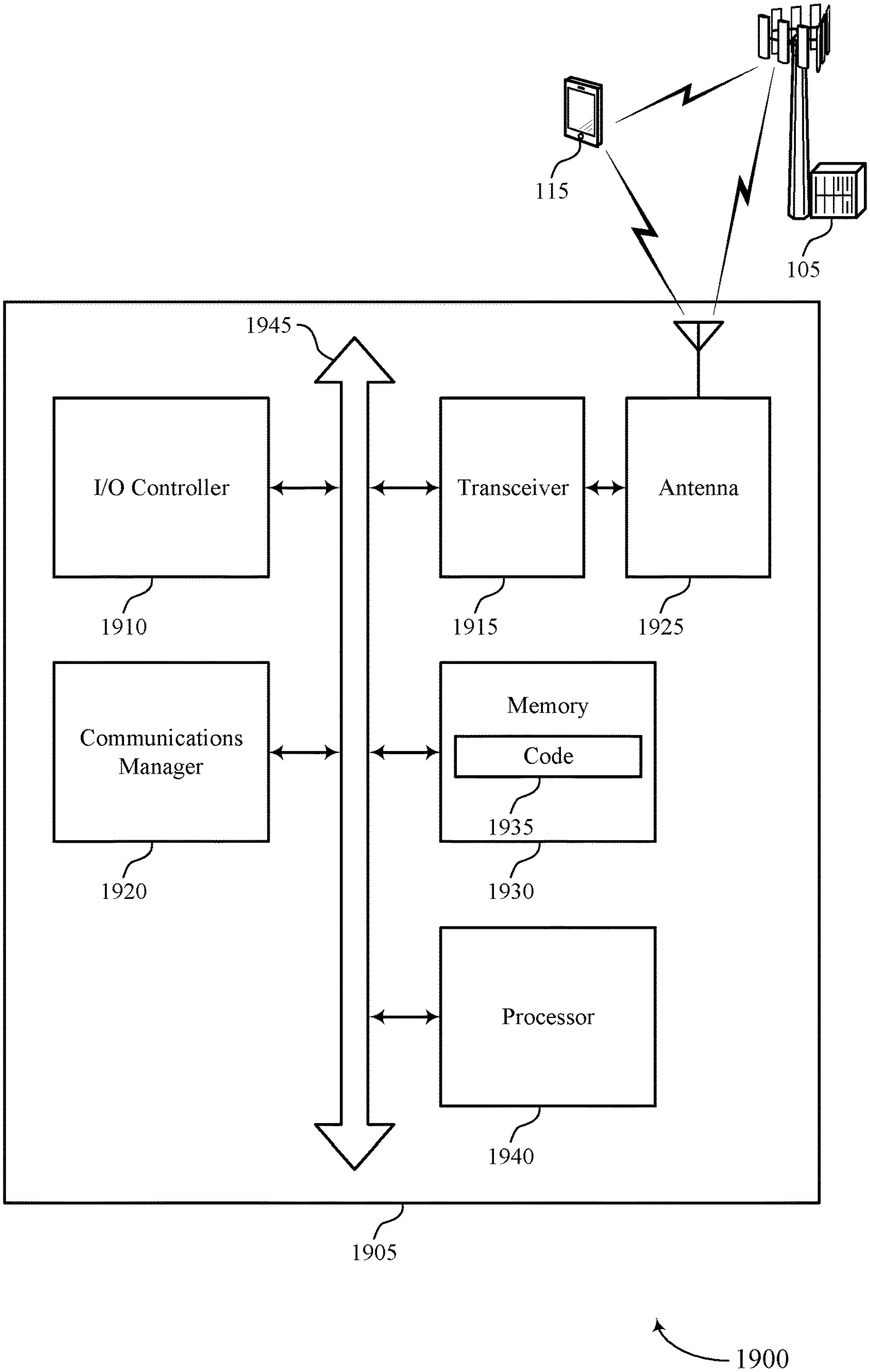
FIG. 19 illustrates a diagram of a system including a device that supports enhancements to PDCCH monitoring and skipping in accordance with one or more aspects of the present disclosure.

FIG. 19 illustrates a diagram of a system 1900 including a device 1905 that supports enhancements to PDCCH monitoring and skipping in accordance with one or more aspects of the present disclosure. The device 1905 may be an example of or include the components of a device 1605, a device 1705, or a UE 115 as described herein. The device 1905 may communicate (e.g., wirelessly) with one or more network entities 105, one or more UEs 115, or any combination thereof. The device 1905 may include components for bi-directional voice and data communications including components for transmitting and receiving communications, such as a communications manager 1920, an input/output (I/O) controller 1910, a transceiver 1915, an antenna 1925, a memory 1930, code 1935, and a processor 1940. These components may be in electronic communication or otherwise coupled (e.g., operatively, communicatively, functionally, electronically, electrically) via one or more buses (e.g., a bus 1945).

The I/O controller 1910 may manage input and output signals for the device 1905. The I/O controller 1910 may also manage peripherals not integrated into the device 1905. In some cases, the I/O controller 1910 may represent a physical connection or port to an external peripheral. In some cases, the I/O controller 1910 may utilize an operating system such as iOS®, ANDROID®, MS-DOS®, MS-WINDOWS®, OS/2®, UNIX®, LINUX®, or another known operating system. Additionally, or alternatively, the I/O controller 1910 may represent or interact with a modem, a keyboard, a mouse, a touchscreen, or a similar device. In some cases, the I/O controller 1910 may be implemented as part of a processor, such as the processor 1940. In some cases, a user may interact with the device 1905 via the I/O controller 1910 or via hardware components controlled by the I/O controller 1910.

In some cases, the device 1905 may include a single antenna 1925. However, in some other cases, the device 1905 may have more than one antenna 1925, which may be capable of concurrently transmitting or receiving multiple wireless transmissions. The transceiver 1915 may communicate bi-directionally, via the one or more antennas 1925, wired, or wireless links as described herein. For example, the transceiver 1915 may represent a wireless transceiver and may communicate bi-directionally with another wireless transceiver. The transceiver 1915 may also include a modem to modulate the packets, to provide the modulated packets to one or more antennas 1925 for transmission, and to demodulate packets received from the one or more antennas 1925. The transceiver 1915, or the transceiver 1915 and one or more antennas 1925, may be an example of a transmitter 1615, a transmitter 1715, a receiver 1610, a receiver 1710, or any combination thereof or component thereof, as described herein.

The memory 1930 may include random access memory (RAM) and read-only memory (ROM). The memory 1930 may store computer-readable, computer-executable code 1935 including instructions that, when executed by the processor 1940, cause the device 1905 to perform various functions described herein. The code 1935 may be stored in a non-transitory computer-readable medium such as system memory or another type of memory. In some cases, the code 1935 may not be directly executable by the processor 1940 but may cause a computer (e.g., when compiled and executed) to perform functions described herein. In some cases, the memory 1930 may contain, among other things, a basic I/O system (BIOS) which may control basic hardware or software operation such as the interaction with peripheral components or devices.

The processor 1940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting enhancements to PDCCH monitoring and skipping). For example, the device 1905 or a component of the device 1905 may include a processor 1940 and memory 1930 coupled with or to the processor 1940, the processor 1940 and memory 1930 configured to perform various functions described herein.

The communications manager 1920 may support wireless communication at a UE in accordance with examples as disclosed herein. For example, the communications manager 1920 may be configured as or otherwise support a means for receiving, from a network entity, a control message including a control channel skipping indication or a switching indication, the control channel skipping indication or the switching indication being associated with an application delay time duration that indicates a beginning of a control channel skipping time duration or a beginning time for a SSSG switch. The communications manager 1920 may be configured as or otherwise support a means for adjusting an ending time of the application delay time duration based on feedback indicating whether a message was successfully received via a data channel. The communications manager 1920 may be configured as or otherwise support a means for skipping monitoring of one or more control channel occasions, or transitioning from a first SSSG to a second SSSG, beginning at the adjusted ending time of the application delay time duration.

By including or configuring the communications manager 1920 in accordance with examples as described herein, the device 1905 may support techniques for ensuring that data transmissions and retransmissions are received, as well as support reducing latency and power consumption at the UE 115 by timely starting PDCCH monitoring skipping or SSSG switching by considering whether data is to be received or not to be received (e.g., HARQ feedback).

In some examples, the communications manager 1920 may be configured to perform various operations (e.g., receiving, monitoring, transmitting) using or otherwise in cooperation with the transceiver 1915, the one or more antennas 1925, or any combination thereof. Although the communications manager 1920 is illustrated as a separate component, in some examples, one or more functions described with reference to the communications manager 1920 may be supported by or performed by the processor 1940, the memory 1930, the code 1935, or any combination thereof. For example, the code 1935 may include instructions executable by the processor 1940 to cause the device 1905 to perform various aspects of enhancements to PDCCH monitoring and skipping as described herein, or the processor 1940 and the memory 1930 may be otherwise configured to perform or support such operations.

Figure 20:
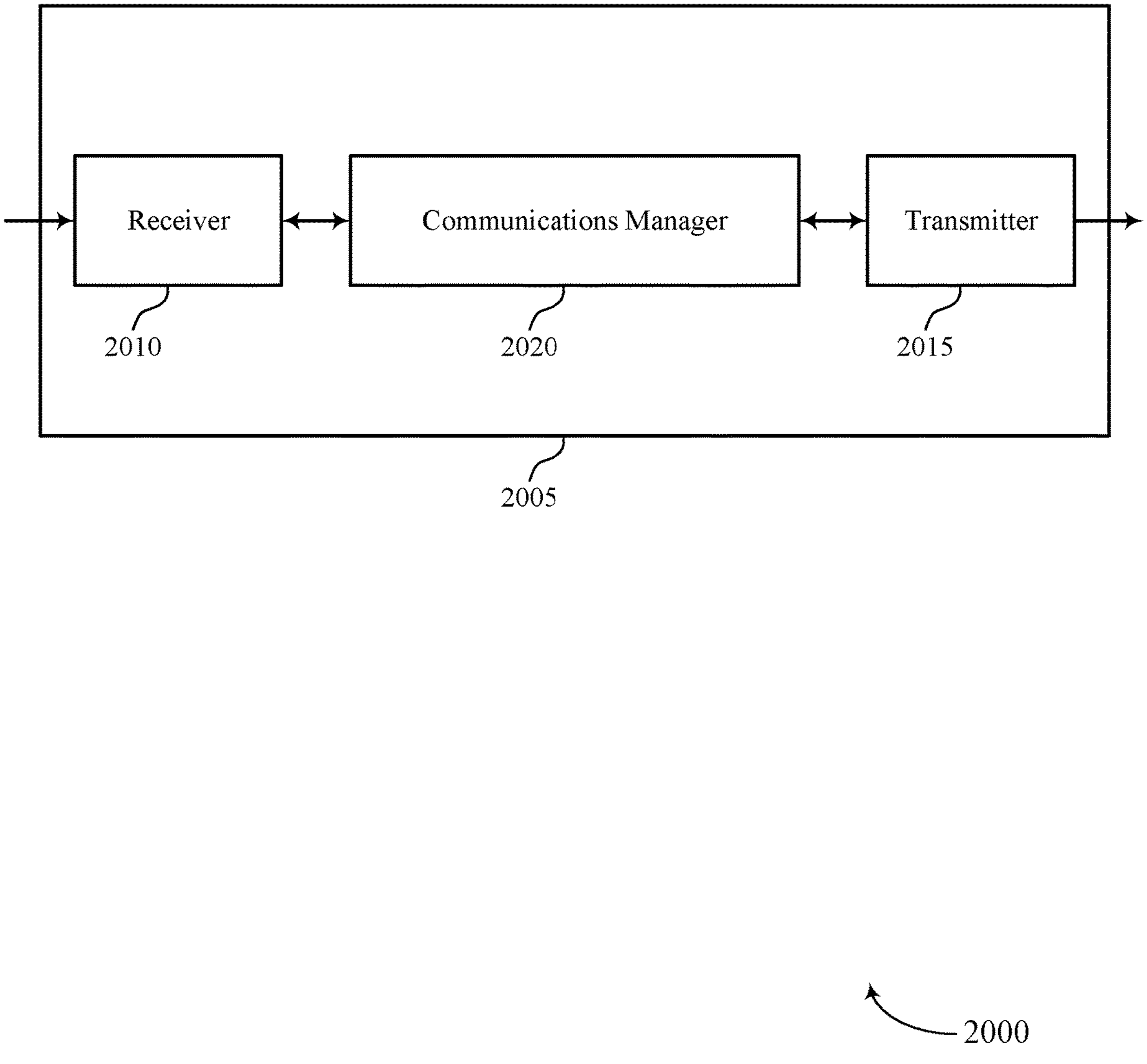
FIGS. 20 and 21 illustrate block diagrams of devices that support enhancements to PDCCH monitoring and skipping in accordance with one or more aspects of the present disclosure.

FIG. 20 illustrates a block diagram 2000 of a device 2005 that supports enhancements to PDCCH monitoring and skipping in accordance with one or more aspects of the present disclosure. The device 2005 may be an example of aspects of a network entity 105 as described herein. The device 2005 may include a receiver 2010, a transmitter 2015, and a communications manager 2020. The device 2005 may also include one or more processors, memory coupled with the one or more processors, and instructions stored in the memory that are executable by the one or more processors to enable the one or more processors to perform the enhancements to PDCCH monitoring and skipping features discussed herein. Each of these components may be in communication with one another (e.g., via one or more buses).

The receiver 2010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 2005. In some examples, the receiver 2010 may support obtaining information by receiving signals via one or more antennas. Additionally, or alternatively, the receiver 2010 may support obtaining information by receiving signals via one or more wired (e.g., electrical, fiber optic) interfaces, wireless interfaces, or any combination thereof.

The transmitter 2015 may provide a means for outputting (e.g., transmitting, providing, conveying, sending) information generated by other components of the device 2005. For example, the transmitter 2015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 2015 may support outputting information by transmitting signals via one or more antennas. Additionally, or alternatively, the transmitter 2015 may support outputting information by transmitting signals via one or more wired (e.g., electrical, fiber optic) interfaces, wireless interfaces, or any combination thereof. In some examples, the transmitter 2015 and the receiver 2010 may be co-located in a transceiver, which may include or be coupled with a modem.

The communications manager 2020, the receiver 2010, the transmitter 2015, or various combinations thereof or various components thereof may be examples of means for performing various aspects of enhancements to PDCCH monitoring and skipping as described herein. For example, the communications manager 2020, the receiver 2010, the transmitter 2015, or various combinations or components thereof may support a method for performing one or more of the functions described herein.

In some examples, the communications manager 2020, the receiver 2010, the transmitter 2015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 2020, the receiver 2010, the transmitter 2015, or various combinations or components thereof may be implemented in code (e.g., as communications management software or firmware) executed by a processor. If implemented in code executed by a processor, the functions of the communications manager 2020, the receiver 2010, the transmitter 2015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 2020 may be configured to perform various operations (e.g., receiving, obtaining, monitoring, outputting, transmitting) using or otherwise in cooperation with the receiver 2010, the transmitter 2015, or both. For example, the communications manager 2020 may receive information from the receiver 2010, send information to the transmitter 2015, or be integrated in combination with the receiver 2010, the transmitter 2015, or both to obtain information, output information, or perform various other operations as described herein.

The communications manager 2020 may support wireless communications in accordance with examples as disclosed herein. For example, the communications manager 2020 may be configured as or otherwise support a means for transmitting, to a UE, a control message including a control channel skipping indication or a switching indication, the control channel skipping indication or the switching indication being associated with an application delay time duration that indicates a beginning of a control channel skipping time duration or a beginning time for a SSSG switch. The communications manager 2020 may be configured as or otherwise support a means for transmitting, to the UE, an indication of an adjustment to an ending time of the application delay time duration.

By including or configuring the communications manager 2020 in accordance with examples as described herein, the device 2005 (e.g., a processor controlling or otherwise coupled with the receiver 2010, the transmitter 2015, the communications manager 2020, or a combination thereof) may support techniques for ensuring that data transmissions and retransmissions are received, as well as support reducing latency and power consumption at the UE 115 by timely starting PDCCH monitoring skipping or SSSG switching by considering whether data is to be received or not to be received (e.g., HARQ feedback).

Figure 21:
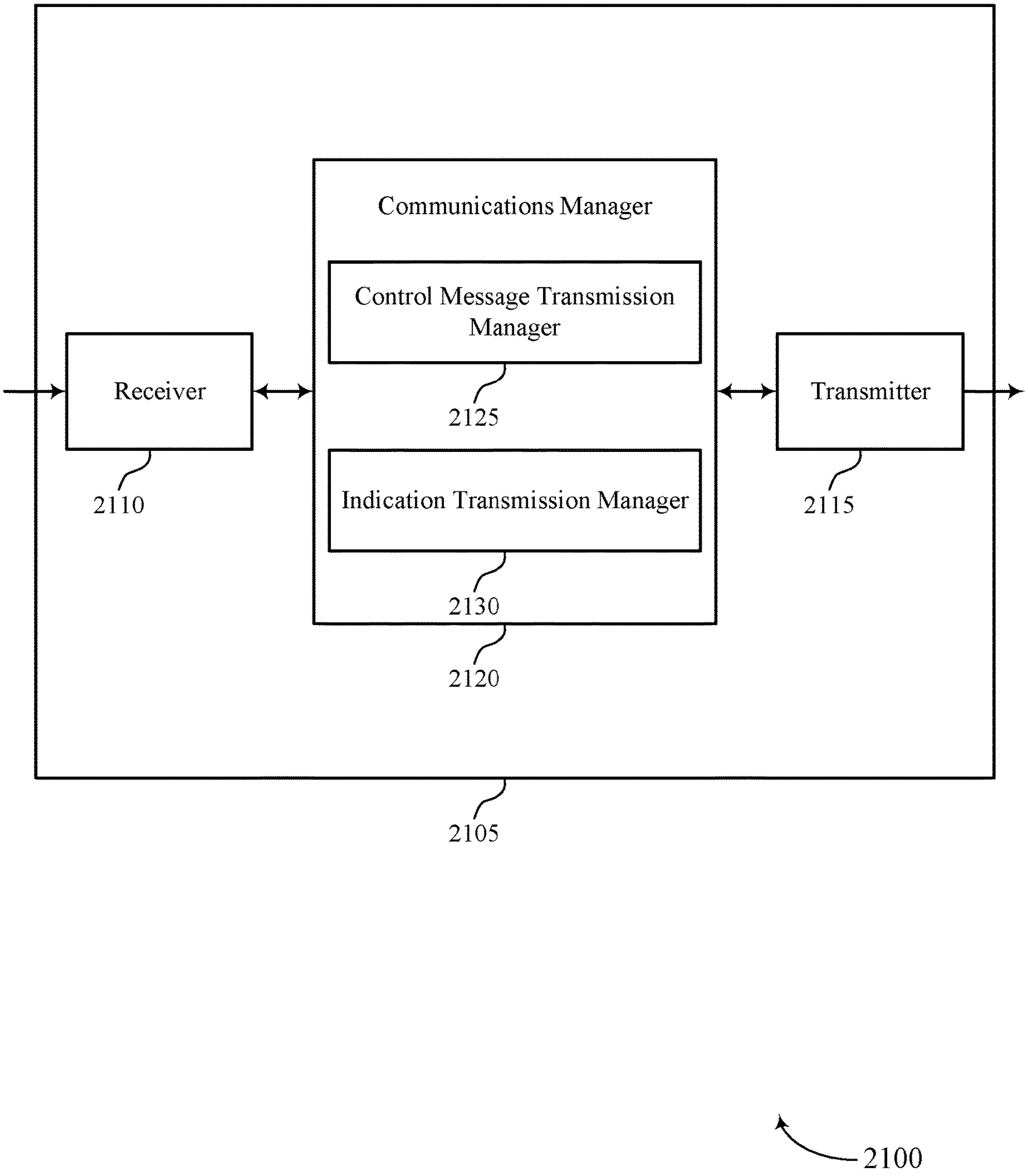

FIG. 21 illustrates a block diagram 2100 of a device 2105 that supports enhancements to PDCCH monitoring and skipping in accordance with one or more aspects of the present disclosure. The device 2105 may be an example of aspects of a device 2005 or a network entity 105 as described herein. The device 2105 may include a receiver 2110, a transmitter 2115, and a communications manager 2120. The device 2105 may also include a processor. Each of these components may be in communication with one another (e.g., via one or more buses).

The receiver 2110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 2105. In some examples, the receiver 2110 may support obtaining information by receiving signals via one or more antennas. Additionally, or alternatively, the receiver 2110 may support obtaining information by receiving signals via one or more wired (e.g., electrical, fiber optic) interfaces, wireless interfaces, or any combination thereof.

The transmitter 2115 may provide a means for outputting (e.g., transmitting, providing, conveying, sending) information generated by other components of the device 2105. For example, the transmitter 2115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 2115 may support outputting information by transmitting signals via one or more antennas. Additionally, or alternatively, the transmitter 2115 may support outputting information by transmitting signals via one or more wired (e.g., electrical, fiber optic) interfaces, wireless interfaces, or any combination thereof. In some examples, the transmitter 2115 and the receiver 2110 may be co-located in a transceiver, which may include or be coupled with a modem.

The device 2105, or various components thereof, may be an example of means for performing various aspects of enhancements to PDCCH monitoring and skipping as described herein. For example, the communications manager 2120 may include a control message transmission manager 2125 an indication transmission manager 2130, or any combination thereof. The communications manager 2120 may be an example of aspects of a communications manager 2020 as described herein. In some examples, the communications manager 2120, or various components thereof, may be configured to perform various operations (e.g., receiving, obtaining, monitoring, outputting, transmitting) using or otherwise in cooperation with the receiver 2110, the transmitter 2115, or both. For example, the communications manager 2120 may receive information from the receiver 2110, send information to the transmitter 2115, or be integrated in combination with the receiver 2110, the transmitter 2115, or both to obtain information, output information, or perform various other operations as described herein.

The communications manager 2120 may support wireless communications in accordance with examples as disclosed herein. The control message transmission manager 2125 may be configured as or otherwise support a means for transmitting, to a UE, a control message including a control channel skipping indication or a switching indication, the control channel skipping indication or the switching indication being associated with an application delay time duration that indicates a beginning of a control channel skipping time duration or a beginning time for a SSSG switch. The indication transmission manager 2130 may be configured as or otherwise support a means for transmitting, to the UE, an indication of an adjustment to an ending time of the application delay time duration.

In some cases, the control message transmission manager 2125 and the indication transmission manager 2130 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control message transmission manager 2125 and the indication transmission manager 2130 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 22:
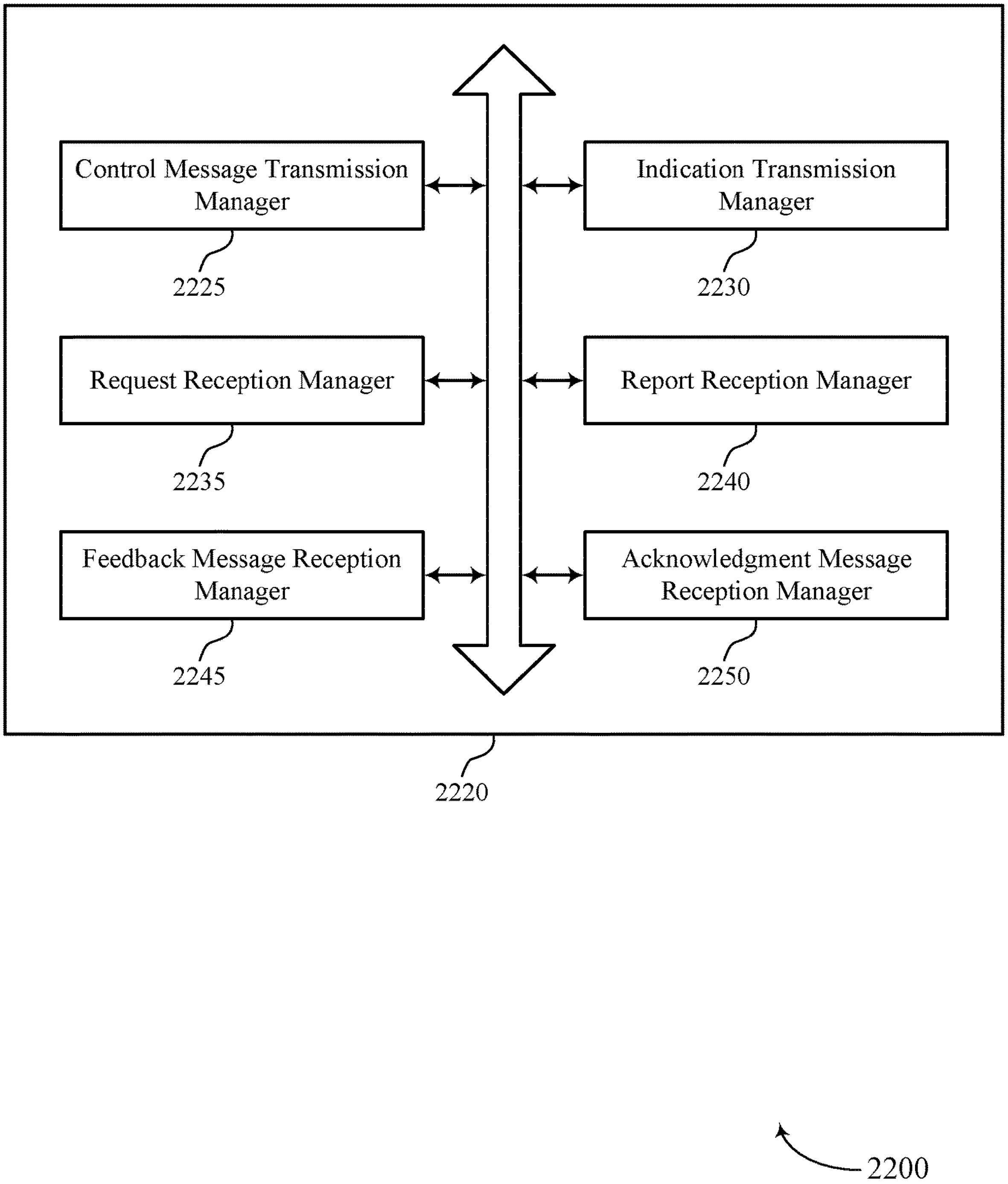
FIG. 22 illustrates a block diagram of a communications manager that supports enhancements to PDCCH monitoring and skipping in accordance with one or more aspects of the present disclosure.

FIG. 22 illustrates a block diagram 2200 of a communications manager 2220 that supports enhancements to PDCCH monitoring and skipping in accordance with one or more aspects of the present disclosure. The communications manager 2220 may be an example of aspects of a communications manager 2020, a communications manager 2120, or both, as described herein. The communications manager 2220, or various components thereof, may be an example of means for performing various aspects of enhancements to PDCCH monitoring and skipping as described herein. For example, the communications manager 2220 may include a control message transmission manager 2225, an indication transmission manager 2230, a request reception manager 2235, a report reception manager 2240, a feedback message reception manager 2245, an acknowledgment message reception manager 2250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 2220 may support wireless communications in accordance with examples as disclosed herein. The control message transmission manager 2225 may be configured as or otherwise support a means for transmitting, to a UE, a control message including a control channel skipping indication or a switching indication, the control channel skipping indication or the switching indication being associated with an application delay time duration that indicates a beginning of a control channel skipping time duration or a beginning time for a SSSG switch. The indication transmission manager 2230 may be configured as or otherwise support a means for transmitting, to the UE, an indication of an adjustment to an ending time of the application delay time duration.

In some examples, the request reception manager 2235 may be configured as or otherwise support a means for receiving, from the UE, a request to update the application delay time duration, where the indication of the adjustment to the ending time of the application delay time duration is responsive to the request.

In some examples, to support transmitting the indication of the adjustment to the ending time of the application delay time duration, the indication transmission manager 2230 may be configured as or otherwise support a means for transmitting the indication of the adjustment to the ending time of the application delay time duration via the control message.

In some examples, the report reception manager 2240 may be configured as or otherwise support a means for receiving, from the UE, a report indicating a power condition at the UE, where the adjustment to the ending time of the application delay time duration is based on transmission of the report indicating the power condition at the UE.

In some examples, the feedback message reception manager 2245 may be configured as or otherwise support a means for receiving, from the UE, a feedback message indicating unsuccessful decoding of the message, where the adjustment to the ending time of the application delay time duration is based on reception of the feedback message.

In some examples, the indication transmission manager 2230 may be configured as or otherwise support a means for transmitting, to the UE, an indication of a packet delay budget or a priority associated with a message scheduled by the control message, where the adjustment to the ending time of the application delay time duration is based on the packet delay budget or the priority associated with the message.

In some examples, the adjustment to the ending time of the application delay time duration is based on an ending time of an active period of a DRX cycle at the UE.

In some examples, the request reception manager 2235 may be configured as or otherwise support a means for receiving, from the UE, a request to perform control channel skipping during a time interval or to switch an active SSSG, where the control channel skipping indication or the switching indication is responsive to the request.

In some examples, to support receiving the request, the request reception manager 2235 may be configured as or otherwise support a means for receiving the request via one of a scheduling request, a buffer status report, a channel state information report, a HARQ feedback message, a RACH message, a transmission end of burst indication from the UE, a UAI, or a PHR.

In some examples, the indication transmission manager 2230 may be configured as or otherwise support a means for transmitting, to the UE, an indication of a configuration for requesting to perform control channel skipping or to switch the active SSSG, where reception of the request is in accordance with the configuration.

In some examples, the acknowledgment message reception manager 2250 may be configured as or otherwise support a means for receiving, from the UE, an acknowledgment message confirming the control channel skipping indication or the switching indication.

In some examples, the request reception manager 2235 may be configured as or otherwise support a means for receiving, from the UE, a request to update the control channel skipping indication or the switching indication, the request indicating the beginning of the control channel skipping time duration, the beginning time for the SSSG switch, or a second SSSG.

In some cases, the control message transmission manager 2225, the indication transmission manager 2230, the request reception manager 2235, the report reception manager 2240, the feedback message reception manager 2245, and the acknowledgment message reception manager 2250 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control message transmission manager 2225, the indication transmission manager 2230, the request reception manager 2235, the report reception manager 2240, the feedback message reception manager 2245, and the acknowledgment message reception manager 2250 discussed herein.

Figure 23:
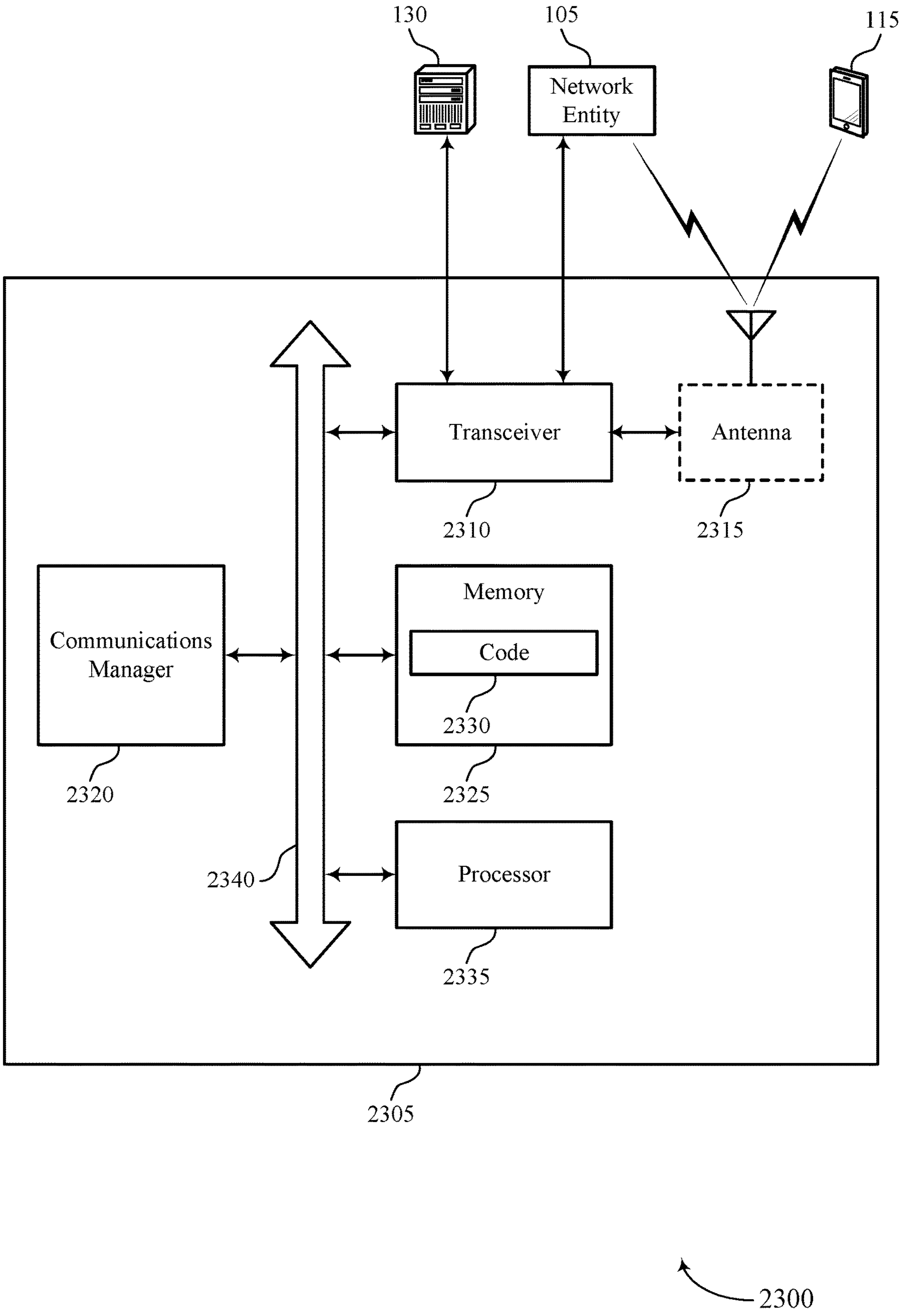
FIG. 23 illustrates a diagram of a system including a device that supports enhancements to PDCCH monitoring and skipping in accordance with one or more aspects of the present disclosure.

FIG. 23 illustrates a diagram of a system 2300 including a device 2305 that supports enhancements to PDCCH monitoring and skipping in accordance with one or more aspects of the present disclosure. The device 2305 may be an example of or include the components of a device 2005, a device 2105, or a network entity 105 as described herein. The device 2305 may communicate with one or more network entities 105, one or more UEs 115, or any combination thereof, which may include communications over one or more wired interfaces, over one or more wireless interfaces, or any combination thereof. The device 2305 may include components that support outputting and obtaining communications, such as a communications manager 2320, a transceiver 2310, an antenna 2315, a memory 2325, code 2330, and a processor 2335. These components may be in electronic communication or otherwise coupled (e.g., operatively, communicatively, functionally, electronically, electrically) via one or more buses (e.g., a bus 2340).

The transceiver 2310 may support bi-directional communications via wired links, wireless links, or both as described herein. In some examples, the transceiver 2310 may include a wired transceiver and may communicate bi-directionally with another wired transceiver. Additionally, or alternatively, in some examples, the transceiver 2310 may include a wireless transceiver and may communicate bi-directionally with another wireless transceiver. In some examples, the device 2305 may include one or more antennas 2315, which may be capable of transmitting or receiving wireless transmissions (e.g., concurrently). The transceiver 2310 may also include a modem to modulate signals, to provide the modulated signals for transmission (e.g., by one or more antennas 2315, by a wired transmitter), to receive modulated signals (e.g., from one or more antennas 2315, from a wired receiver), and to demodulate signals. In some implementations, the transceiver 2310 may include one or more interfaces, such as one or more interfaces coupled with the one or more antennas 2315 that are configured to support various receiving or obtaining operations, or one or more interfaces coupled with the one or more antennas 2315 that are configured to support various transmitting or outputting operations, or a combination thereof. In some implementations, the transceiver 2310 may include or be configured for coupling with one or more processors or memory components that are operable to perform or support operations based on received or obtained information or signals, or to generate information or other signals for transmission or other outputting, or any combination thereof. In some implementations, the transceiver 2310, or the transceiver 2310 and the one or more antennas 2315, or the transceiver 2310 and the one or more antennas 2315 and one or more processors or memory components (for example, the processor 2335, or the memory 2325, or both), may be included in a chip or chip assembly that is installed in the device 2305. In some examples, the transceiver may be operable to support communications via one or more communications links (e.g., a communication link 125, a backhaul communication link 120, a midhaul communication link 162, a fronthaul communication link 168).

The memory 2325 may include RAM and ROM. The memory 2325 may store computer-readable, computer-executable code 2330 including instructions that, when executed by the processor 2335, cause the device 2305 to perform various functions described herein. The code 2330 may be stored in a non-transitory computer-readable medium such as system memory or another type of memory. In some cases, the code 2330 may not be directly executable by the processor 2335 but may cause a computer (e.g., when compiled and executed) to perform functions described herein. In some cases, the memory 2325 may contain, among other things, a BIOS which may control basic hardware or software operation such as the interaction with peripheral components or devices.

The processor 2335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 2335 may be configured to operate a memory array using a memory controller. In some other cases, a memory controller may be integrated into the processor 2335. The processor 2335 may be configured to execute computer-readable instructions stored in a memory (e.g., the memory 2325) to cause the device 2305 to perform various functions (e.g., functions or tasks supporting enhancements to PDCCH monitoring and skipping). For example, the device 2305 or a component of the device 2305 may include a processor 2335 and memory 2325 coupled with the processor 2335, the processor 2335 and memory 2325 configured to perform various functions described herein. The processor 2335 may be an example of a cloud-computing platform (e.g., one or more physical nodes and supporting software such as operating systems, virtual machines, or container instances) that may host the functions (e.g., by executing code 2330) to perform the functions of the device 2305. The processor 2335 may be any one or more suitable processors capable of executing scripts or instructions of one or more software programs stored in the device 2305 (such as within the memory 2325). In some implementations, the processor 2335 may be a component of a processing system. A processing system may generally refer to a system or series of machines or components that receives inputs and processes the inputs to produce a set of outputs (which may be passed to other systems or components of, for example, the device 2305). For example, a processing system of the device 2305 may refer to a system including the various other components or subcomponents of the device 2305, such as the processor 2335, or the transceiver 2310, or the communications manager 2320, or other components or combinations of components of the device 2305. The processing system of the device 2305 may interface with other components of the device 2305, and may process information received from other components (such as inputs or signals) or output information to other components. For example, a chip or modem of the device 2305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 2305 may transmit information output from the chip or modem. Additionally, or alternatively, in some implementations, the one or more interfaces may refer to an interface between the processing system of the chip or modem and a receiver, such that the device 2305 may obtain information or signal inputs, and the information may be passed to the processing system. A person having ordinary skill in the art will readily recognize that a first interface also may obtain information or signal inputs, and a second interface also may output information or signal outputs.

In some examples, a bus 2340 may support communications of (e.g., within) a protocol layer of a protocol stack. In some examples, a bus 2340 may support communications associated with a logical channel of a protocol stack (e.g., between protocol layers of a protocol stack), which may include communications performed within a component of the device 2305, or between different components of the device 2305 that may be co-located or located in different locations (e.g., where the device 2305 may refer to a system in which one or more of the communications manager 2320, the transceiver 2310, the memory 2325, the code 2330, and the processor 2335 may be located in one of the different components or divided between different components).

In some examples, the communications manager 2320 may manage aspects of communications with a core network 130 (e.g., via one or more wired or wireless backhaul links). For example, the communications manager 2320 may manage the transfer of data communications for client devices, such as one or more UEs 115. In some examples, the communications manager 2320 may manage communications with other network entities 105, and may include a controller or scheduler for controlling communications with UEs 115 in cooperation with other network entities 105. In some examples, the communications manager 2320 may support an X2 interface within an LTE/LTE-A wireless communications network technology to provide communication between network entities 105.

The communications manager 2320 may support wireless communications in accordance with examples as disclosed herein. For example, the communications manager 2320 may be configured as or otherwise support a means for transmitting, to a UE, a control message including a control channel skipping indication or a switching indication, the control channel skipping indication or the switching indication being associated with an application delay time duration that indicates a beginning of a control channel skipping time duration or a beginning time for a SSSG switch. The communications manager 2320 may be configured as or otherwise support a means for transmitting, to the UE, an indication of an adjustment to an ending time of the application delay time duration.

By including or configuring the communications manager 2320 in accordance with examples as described herein, the device 2305 may support techniques for ensuring that data transmissions and retransmissions are received, as well as support reducing latency and power consumption at the UE 115 by timely starting PDCCH monitoring skipping or SSSG switching by considering whether data is to be received or not to be received (e.g., HARQ feedback).

In some examples, the communications manager 2320 may be configured to perform various operations (e.g., receiving, obtaining, monitoring, outputting, transmitting) using or otherwise in cooperation with the transceiver 2310, the one or more antennas 2315 (e.g., where applicable), or any combination thereof. Although the communications manager 2320 is illustrated as a separate component, in some examples, one or more functions described with reference to the communications manager 2320 may be supported by or performed by the transceiver 2310, the processor 2335, the memory 2325, the code 2330, or any combination thereof. For example, the code 2330 may include instructions executable by the processor 2335 to cause the device 2305 to perform various aspects of enhancements to PDCCH monitoring and skipping as described herein, or the processor 2335 and the memory 2325 may be otherwise configured to perform or support such operations.

Figure 24:
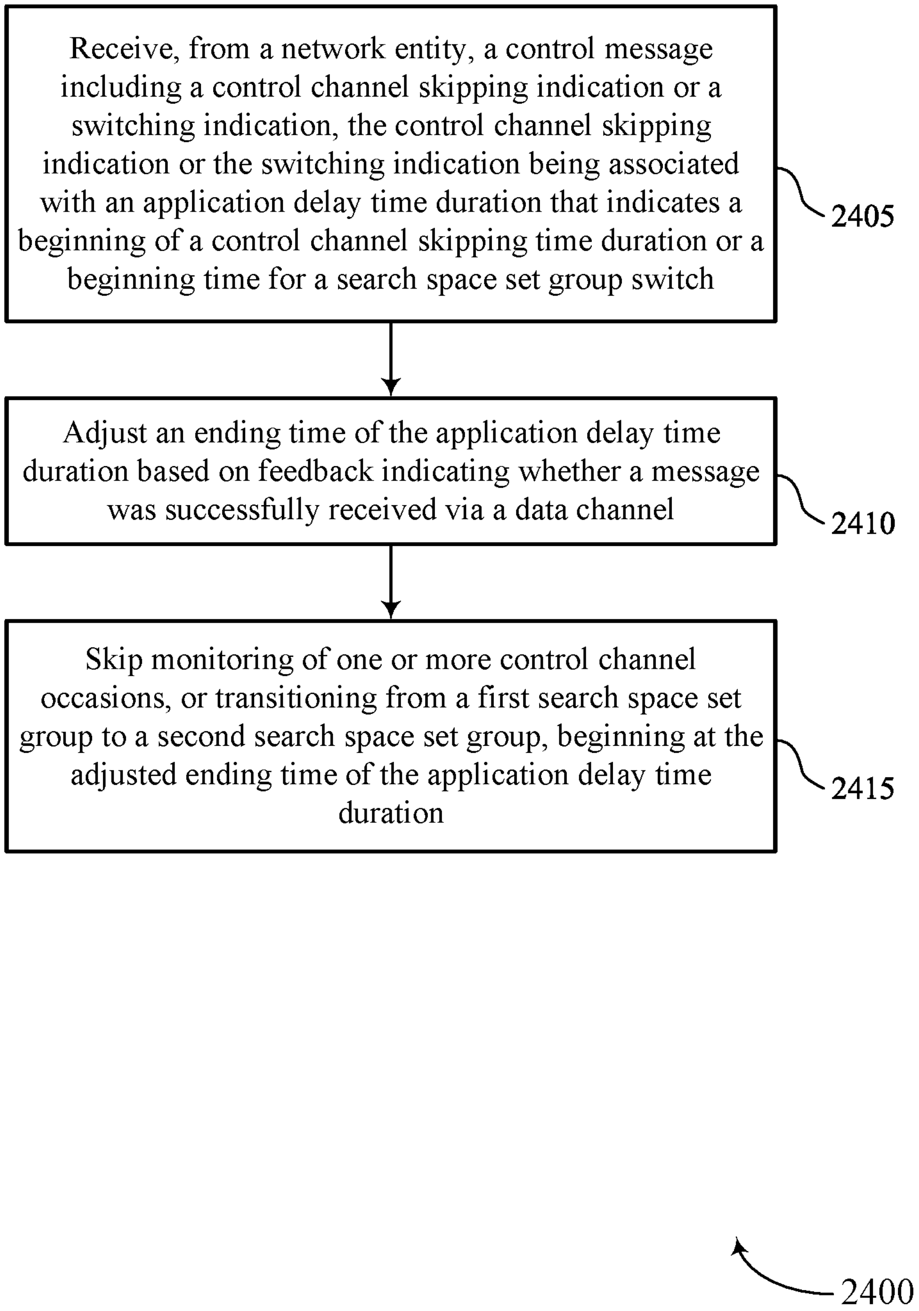

FIG. 24 illustrates a flowchart showing a method 2400 that supports enhancements to PDCCH monitoring and skipping in accordance with one or more aspects of the present disclosure. The operations of the method 2400 may be implemented by a UE or its components as described herein. For example, the operations of the method 2400 may be performed by a UE 115 as described with reference to FIGS. 1 through 19. In some examples, a UE may execute a set of instructions to control the functional elements of the UE to perform the described functions. Additionally, or alternatively, the UE may perform aspects of the described functions using special-purpose hardware.

At 2405, the method may include receiving, from a network entity, a control message including a control channel skipping indication or a switching indication, the control channel skipping indication or the switching indication being associated with an application delay time duration that indicates a beginning of a control channel skipping time duration or a beginning time for a SSSG switch. The operations of 2405 may be performed in accordance with examples as disclosed herein. In some examples, aspects of the operations of 2405 may be performed by a control message reception manager 1825 as described with reference to FIG. 18.

At 2410, the method may include adjusting an ending time of the application delay time duration based on feedback indicating whether a message was successfully received via a data channel. The operations of 2410 may be performed in accordance with examples as disclosed herein. In some examples, aspects of the operations of 2410 may be performed by an application delay time duration manager 1830 as described with reference to FIG. 18.

At 2415, the method may include skipping monitoring of one or more control channel occasions, or transitioning from a first SSSG to a second SSSG, beginning at the adjusted ending time of the application delay time duration. The operations of 2415 may be performed in accordance with examples as disclosed herein. In some examples, aspects of the operations of 2415 may be performed by a monitoring manager 1835 as described with reference to FIG. 18.

FIG. 25 illustrates a flowchart showing a method 2500 that supports enhancements to PDCCH monitoring and skipping in accordance with one or more aspects of the present disclosure. The operations of the method 2500 may be implemented by a network entity or its components as described herein. For example, the operations of the method 2500 may be performed by a network entity as described with reference to FIGS. 1 through 15 and 20 through 23. In some examples, a network entity may execute a set of instructions to control the functional elements of the network entity to perform the described functions. Additionally, or alternatively, the network entity may perform aspects of the described functions using special-purpose hardware.

At 2505, the method may include transmitting, to a UE, a control message including a control channel skipping indication or a switching indication, the control channel skipping indication or the switching indication being associated with an application delay time duration that indicates a beginning of a control channel skipping time duration or a beginning time for a SSSG switch. The operations of 2505 may be performed in accordance with examples as disclosed herein. In some examples, aspects of the operations of 2505 may be performed by a control message transmission manager 2225 as described with reference to FIG. 22.

At 2510, the method may include transmitting, to the UE, an indication of an adjustment to an ending time of the application delay time duration. The operations of 2510 may be performed in accordance with examples as disclosed herein. In some examples, aspects of the operations of 2510 may be performed by an indication transmission manager 2230 as described with reference to FIG. 22.

The following provides an overview of aspects of the present disclosure:

Aspect 1: A method for wireless communication at a UE, comprising: receiving, from a network entity, a control message comprising a control channel skipping indication or a switching indication, the control channel skipping indication or the switching indication being associated with an application delay time duration that indicates a beginning of a control channel skipping time duration or a beginning time for a SSSG switch; adjusting an ending time of the application delay time duration based at least in part on feedback indicating whether a message was successfully received via a data channel; and skipping monitoring of one or more control channel occasions, or transitioning from a first SSSG to a second SSSG, beginning at the adjusted ending time of the application delay time duration.

Aspect 2: The method of aspect 1, further comprising: receiving, from the network entity, an indication of an update to the application delay time duration, wherein adjusting the ending time of the application delay time duration is based at least in part on the update.

Aspect 3: The method of aspect 2, further comprising: transmitting, to the network entity, a request to update the application delay time duration, wherein the indication of the update to the application delay time duration is responsive to the request.

Aspect 4: The method of any of aspects 2 through 3, wherein receiving the indication of the update to the application delay time duration comprises: receiving the indication of the update to the application delay time duration via the control message.

Aspect 5: The method of any of aspects 1 through 4, wherein adjusting the ending time of the application delay time duration further comprises: adjusting the ending time of the application delay time duration based at least in part on at least one of a power condition at the UE, a traffic information at the UE, a decoding status of data packets at the UE, or any combination thereof.

Aspect 6: The method of aspect 5, further comprising: transmitting, to the network entity, a report indicating the power condition at the UE, wherein adjusting the ending time of the application delay time duration is based at least in part on transmission of the report indicating at least a portion of the power condition at the UE, the traffic information at the UE, the decoding status of the data packets at the UE, or any combination thereof.

Aspect 7: The method of any of aspects 1 through 6, further comprising: transmitting, to the network entity, a feedback message indicating unsuccessful decoding of the message, wherein adjusting the ending time of the application delay time duration is based at least in part on transmission of the feedback message.

Aspect 8: The method of any of aspects 1 through 7, further comprising: receiving, from the network entity, an indication of a packet delay budget or a priority associated with the message, wherein adjusting the ending time of the application delay time duration is based at least in part on the packet delay budget or the priority associated with the message.

Aspect 9: The method of aspect 8, further comprising: cancelling transmission of a feedback message for the message based at least in part on a remainder of the packet delay budget being less than a threshold, wherein adjusting the ending time of the application delay time duration is based at least in part on cancelling transmission of the feedback message.

Aspect 10: The method of any of aspects 1 through 9, wherein adjusting the ending time of the application delay time duration further comprises: adjusting the ending time of the application delay time duration based at least in part on an ending time of an active period of a DRX cycle at the UE.

Aspect 11: The method of any of aspects 1 through 10, further comprising: transmitting, to the network entity, a request to perform control channel skipping during a time interval or to switch an active SSSG, wherein the control channel skipping indication or the switching indication is responsive to the request, and wherein the request is transmitted based at least in part on a trigger event.

Aspect 12: The method of aspect 11, wherein the trigger event comprises at least one of power condition, an energy harvesting condition, a traffic condition, or any combination thereof.

Aspect 13: The method of any of aspects 11 through 12, wherein transmitting the request comprises: transmitting the request via one or more of at least one of a dedicated resource for data transmission, a dedicated resource for control transmission, a scheduling request, a buffer status report, a UAI report, a HARQ feedback message, a RACH message, a transmission end of burst indication from the UE, a UAI, a PHR, or any combination thereof.

Aspect 14: The method of any of aspects 11 through 13, further comprising: receiving an indication of a configuration for requesting to perform control channel skipping or to switch the active SSSG, wherein transmission of the request is in accordance with the configuration.

Aspect 15: The method of any of aspects 1 through 14, further comprising: transmitting, to the network entity, an acknowledgment message confirming the control channel skipping indication or the switching indication, wherein the skipping monitoring of one or more control channel occasions or transitioning from the first SSSG to the second SSSG is based at least in part on the acknowledgment message.

Aspect 16: The method of any of aspects 1 through 15, further comprising: transmitting, to the network entity, a request to update the control channel skipping indication or the switching indication, the request indicating the beginning of the control channel skipping time duration, the beginning time for the SSSG switch, or the second SSSG.

Aspect 17: A method for wireless communications, comprising: transmitting, to a UE, a control message scheduling transmission of a message in a data channel and comprising a control channel skipping indication or a switching indication, the control channel skipping indication or the switching indication being associated with an application delay time duration that indicates a beginning of a control channel skipping time duration or a beginning time for a SSSG switch; and transmitting, to the UE, an indication of an adjustment to an ending time of the application delay time duration.

Aspect 18: The method of aspect 17, further comprising: receiving, from the UE, a request to update the application delay time duration, wherein the indication of the adjustment to the ending time of the application delay time duration is responsive to the request.

Aspect 19: The method of any of aspects 17 through 18, wherein transmitting the indication of the adjustment to the ending time of the application delay time duration comprises: transmitting the indication of the adjustment to the ending time of the application delay time duration via the control message.

Aspect 20: The method of any of aspects 17 through 19, further comprising: receiving, from the UE, a report indicating a power condition at the UE, wherein the adjustment to the ending time of the application delay time duration is based at least in part on transmission of the report indicating the power condition at the UE.

Aspect 21: The method of any of aspects 17 through 20, further comprising: receiving, from the UE, a feedback message indicating unsuccessful decoding of the message, wherein the adjustment to the ending time of the application delay time duration is based at least in part on reception of the feedback message.

Aspect 22: The method of any of aspects 17 through 21, further comprising: transmitting, to the UE, an indication of a packet delay budget or a priority associated with a message scheduled by the control message, wherein the adjustment to the ending time of the application delay time duration is based at least in part on the packet delay budget or the priority associated with the message.

Aspect 23: The method of any of aspects 17 through 22, wherein the adjustment to the ending time of the application delay time duration is based at least in part on an ending time of an active period of a DRX cycle at the UE.

Aspect 24: The method of any of aspects 17 through 23, further comprising: receiving, from the UE, a request to perform control channel skipping during a time interval or to switch an active SSSG, wherein the control channel skipping indication or the switching indication is responsive to the request.

Aspect 25: The method of aspect 24, wherein receiving the request comprises: receiving the request via one or more of at least one of a dedicated resource for data transmission, a dedicated resource for control transmission, a scheduling request, a buffer status report, a UAI report, a HARQ feedback message, a RACH message, a transmission end of burst indication from the UE, a UAI, a PHR, or any combination thereof.

Aspect 26: The method of any of aspects 24 through 25, further comprising: transmitting, to the UE, an indication of a configuration for requesting to perform control channel skipping or to switch the active SSSG, wherein reception of the request is in accordance with the configuration.

Aspect 27: The method of any of aspects 17 through 26, further comprising: receiving, from the UE, an acknowledgment message confirming the control channel skipping indication or the switching indication.

Aspect 28: The method of any of aspects 17 through 27, further comprising: receiving, from the UE, a request to update the control channel skipping indication or the switching indication, the request indicating the beginning of the control channel skipping time duration, the beginning time for the SSSG switch, or a second SSSG.

Aspect 29: An apparatus for wireless communication at a UE, comprising a processor; memory coupled with the processor; and instructions stored in the memory and executable by the processor to cause the apparatus to perform a method of any of aspects 1 through 16.

Aspect 30: An apparatus for wireless communication at a UE, comprising at least one means for performing a method of any of aspects 1 through 16.

Aspect 31: A non-transitory computer-readable medium storing code for wireless communication at a UE, the code comprising instructions executable by a processor to perform a method of any of aspects 1 through 16.

Aspect 32: An apparatus for wireless communications, comprising a processor; memory coupled with the processor; and instructions stored in the memory and executable by the processor to cause the apparatus to perform a method of any of aspects 17 through 28.

Aspect 33: An apparatus for wireless communications, comprising at least one means for performing a method of any of aspects 17 through 28.

Aspect 34: A non-transitory computer-readable medium storing code for wireless communications, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more processors;

memory coupled with the one or more processors; and instructions stored in the memory and executable by the one or more processors to cause the UE to:

receive, from a network entity, a control message comprising a control channel skipping indication or a switching indication, the control channel skipping indication or the switching indication being associated with an application delay time duration that indicates a beginning of a control channel skipping time duration or a beginning time for a search space set group switch;

adjust an ending time of the application delay time duration based at least in part on feedback indicating whether a message was successfully received via a data channel; and skip monitoring of one or more control channel occasions, or transition from a first search space set group to a second search space set group, beginning at the adjusted ending time of the application delay time duration.

2. The UE of claim 1, wherein the instructions are further executable by the one or more processors to cause the UE to:

receive, from the network entity, an indication of an update to the application delay time duration, wherein the adjustment to the ending time of the application delay time duration is based at least in part on the update.

3. The UE of claim 2, wherein the instructions are further executable by the one or more processors to cause the UE to:

transmit, to the network entity, a request to update the application delay time duration, wherein the indication of the update to the application delay time duration is responsive to the request.

4. The UE of claim 2, wherein the instructions are further executable by the one or more processors to receive the indication of the update to the application delay time duration by being executable by the one or more processors to:

receive the indication of the update to the application delay time duration via the control message.

5. The UE of claim 1, wherein the instructions are further executable by the one or more processors to adjust the ending time of the application delay time duration by being executable by the one or more processors to:

adjust the ending time of the application delay time duration based at least in part on at least one of a power condition at the UE, a traffic information at the UE, a decoding status of data packets at the UE, or any combination thereof.

6. The UE of claim 5, wherein the instructions are further executable by the one or more processors to cause the UE to:

transmit, to the network entity, a report indicating the power condition at the UE, wherein the adjustment to the ending time of the application delay time duration is based at least in part on transmission of the report indicating at least a portion of the power condition at the UE, the traffic information at the UE, the decoding status of the data packets at the UE, or any combination thereof.

7. The UE of claim 1, wherein the instructions are further executable by the one or more processors to cause the UE to:

transmit, to the network entity, a feedback message indicating unsuccessful decoding of the message, wherein the adjustment to the ending time of the application delay time duration is based at least in part on transmission of the feedback message.

8. The UE of claim 1, wherein the instructions are further executable by the one or more processors to cause the UE to:

receive, from the network entity, an indication of a packet delay budget or a priority associated with the message, wherein the adjustment to the ending time of the application delay time duration is based at least in part on the packet delay budget or the priority associated with the message.

9. The UE of claim 8, wherein the instructions are further executable by the one or more processors to cause the UE to:

cancel transmission of a feedback message for the message based at least in part on a remainder of the packet delay budget being less than a threshold, wherein the adjustment to the ending time of the application delay time duration is based at least in part on cancelling transmission of the feedback message.

10. The UE of claim 1, wherein the instructions are further executable by the one or more processors to adjust the ending time of the application delay time duration by being executable by the one or more processors to:

adjust the ending time of the application delay time duration based at least in part on an ending time of an active period of a discontinuous reception cycle at the UE.

11. The UE of claim 1, wherein the instructions are further executable by the one or more processors to cause the UE to:

transmit, to the network entity, a request to perform control channel skipping during a time interval or to switch an active search space set group, wherein the control channel skipping indication or the switching indication is responsive to the request, and wherein the request is transmitted based at least in part on a trigger event.

12. The UE of claim 11, wherein the trigger event comprises at least one of power condition, an energy harvesting condition, a traffic condition, or any combination thereof.

13. The UE of claim 11, wherein the instructions are further executable by the one or more processors to transmit the request by being executable by the one or more processors to:

transmit the request via one or more of at least one of a dedicated resource for data transmission, a dedicated resource for control transmission, a scheduling request, a buffer status report, a channel state information report, a hybrid automatic repeat request feedback message, a random access channel message, a transmission end of burst indication from the UE, a user assistance information, a power headroom report, or any combination thereof.

14. The UE of claim 11, wherein the instructions are further executable by the one or more processors to cause the UE to:

receive an indication of a configuration for requesting to perform the control channel skipping or to switch the active search space set group, wherein transmission of the request is in accordance with the configuration.

15. The UE of claim 1, wherein the instructions are further executable by the one or more processors to cause the UE to:

transmit, to the network entity, an acknowledgment message confirming the control channel skipping indication or the switching indication, wherein skipping the monitoring of the one or more control channel occasions or transitioning from the first search space set group to the second search space set group is based at least in part on the acknowledgment message.

16. The UE of claim 1, wherein the instructions are further executable by the one or more processors to cause the UE to:

transmit, to the network entity, a request to update the control channel skipping indication or the switching indication, the request indicating the beginning of the control channel skipping time duration, the beginning time for the search space set group switch, or the second search space set group.

17. An apparatus for wireless communications, comprising:

one or more processors;

memory coupled with the one or more processors; and instructions stored in the memory and executable by the one or more processors to cause the apparatus to:

transmit, to a user equipment (UE), a control message comprising a control channel skipping indication or a switching indication, the control channel skipping indication or the switching indication being associated with an application delay time duration that indicates a beginning of a control channel skipping time duration or a beginning time for a search space set group switch; and transmit, to the UE, an indication of an adjustment to an ending time of the application delay time duration.

18. The apparatus of claim 17, wherein the instructions are further executable by the one or more processors to cause the apparatus to:

receive, from the UE, a request to update the application delay time duration, wherein the indication of the adjustment to the ending time of the application delay time duration is responsive to the request.

19. The apparatus of claim 17, wherein the instructions are further executable by the one or more processors to transmit the indication of the adjustment to the ending time of the application delay time duration by being executable by the one or more processors to:

transmit the indication of the adjustment to the ending time of the application delay time duration via the control message.

20. The apparatus of claim 17, wherein the instructions are further executable by the one or more processors to cause the apparatus to:

receive, from the UE, a report indicating a power condition at the UE, wherein the adjustment to the ending time of the application delay time duration is based at least in part on transmission of the report indicating the power condition at the UE.

21. The apparatus of claim 17, wherein the instructions are further executable by the one or more processors to cause the apparatus to:

receive, from the UE, a feedback message indicating unsuccessful decoding of a message, wherein the adjustment to the ending time of the application delay time duration is based at least in part on reception of the feedback message.

22. The apparatus of claim 17, wherein the instructions are further executable by the one or more processors to cause the apparatus to:

transmit, to the UE, an indication of a packet delay budget or a priority associated with a message scheduled by the control message, wherein the adjustment to the ending time of the application delay time duration is based at least in part on the packet delay budget or the priority associated with the message.

23. The apparatus of claim 17, wherein the adjustment to the ending time of the application delay time duration is based at least in part on an ending time of an active period of a discontinuous reception cycle at the UE.

24. The apparatus of claim 17, wherein the instructions are further executable by the one or more processors to cause the apparatus to:

receive, from the UE, a request to perform control channel skipping during a time interval or to switch an active search space set group, wherein the control channel skipping indication or the switching indication is responsive to the request.

25. The apparatus of claim 24, wherein the instructions are further executable to receive the request by being executable by the one or more processors to:

receive the request via one or more of at least one of a dedicated resource for data transmission, a dedicated resource for control transmission, a scheduling request, a buffer status report, a channel state information report, a hybrid automatic repeat request feedback message, a random access channel message, a transmission end of burst indication from the UE, a user assistance information, a power headroom report, or any combination thereof.

26. The apparatus of claim 24, wherein the instructions are further executable by the one or more processors to cause the apparatus to:

transmit, to the UE, an indication of a configuration for requesting to perform the control channel skipping or to switch the active search space set group, wherein reception of the request is in accordance with the configuration.

27. The apparatus of claim 17, wherein the instructions are further executable by the one or more processors to cause the apparatus to:

receive, from the UE, an acknowledgment message confirming the control channel skipping indication or the switching indication.

28. The apparatus of claim 17, wherein the instructions are further executable by the one or more processors to cause the apparatus to:

receive, from the UE, a request to update the control channel skipping indication or the switching indication, the request indicating the beginning of the control channel skipping time duration, the beginning time for the search space set group switch, or a second search space set group.

29. A method for wireless communication at a user equipment (UE), comprising:

receiving, from a network entity, a control message comprising a control channel skipping indication or a switching indication, the control channel skipping indication or the switching indication being associated with an application delay time duration that indicates a beginning of a control channel skipping time duration or a beginning time for a search space set group switch;

adjusting an ending time of the application delay time duration based at least in part on feedback indicating whether a message was successfully received via a data channel; and skipping monitoring of one or more control channel occasions, or transitioning from a first search space set group to a second search space set group, beginning at the adjusted ending time of the application delay time duration.

30. A method for wireless communications, comprising:

transmitting, to a user equipment (UE), a control message comprising a control channel skipping indication or a switching indication, the control channel skipping indication or the switching indication being associated with an application delay time duration that indicates a beginning of a control channel skipping time duration or a beginning time for a search space set group switch; and transmitting, to the UE, an indication of an adjustment to an ending time of the application delay time duration.

* * * * *